(12) United States Patent
Bill et al.

(10) Patent No.: US 11,814,024 B2
(45) Date of Patent: Nov. 14, 2023

(54) AIRCRAFT BRAKING

(71) Applicants: AIRBUS OPERATIONS LIMITED, Bristol (GB); AIRBUS OPÉRATIONS (S.A.S.), Toulouse (FR); AIRBUS (S.A.S.), Blagnac (FR)

(72) Inventors: Andrew Bill, Bristol (GB); Utsav Oza, Bristol (GB); Esther Ramirez-Paya, Bristol (GB); David Joel Clarke, Bristol (GB)

(73) Assignees: AIRBUS OPERATIONS LIMITED, Bristol (GB); AIRBUS OPÉRATIONS (S.A.S.), Toulouse (FR); AIRBUS (S.A.S.), Blagnac (FR)

( * ) Notice: Subject to any disclaimer, the term of this patent is extended or adjusted under 35 U.S.C. 154(b) by 1108 days.

(21) Appl. No.: 16/285,950

(22) Filed: Feb. 26, 2019

(65) Prior Publication Data
US 2019/0263510 A1     Aug. 29, 2019

(30) Foreign Application Priority Data

Feb. 27, 2018   (GB) .................................... 1803203
Jul. 6, 2018    (GB) .................................... 1811179

(51) Int. Cl.
  *B60T 8/00*     (2006.01)
  *B60T 17/22*    (2006.01)
  (Continued)

(52) U.S. Cl.
  CPC ............ *B60T 17/221* (2013.01); *B60T 8/171* (2013.01); *B60T 8/1703* (2013.01); *B60T 8/32* (2013.01);
  (Continued)

(58) Field of Classification Search
  CPC ...... B60T 17/221; B60T 8/1703; B60T 8/171; B60T 8/32; B60T 8/58; B60T 2270/406;
  (Continued)

(56) References Cited

U.S. PATENT DOCUMENTS 5,217,282 A   6/1993  Guichard
5,390,990 A   2/1995  Cook et al.
(Continued)

FOREIGN PATENT DOCUMENTS

EP    0329373    8/1989
EP    0384071    8/1990
(Continued)

OTHER PUBLICATIONS

Combined Search and Examination Report for United Kingdom Application No. GB 1811179. 9, nine pages, dated Feb. 25, 2019.
(Continued)

*Primary Examiner* — Shardul D Patel
(74) *Attorney, Agent, or Firm* — Nixon & Vanderhye P.C.

(57) ABSTRACT

A braking system and a method for applying one or more aircraft wheel brakes according to at least one of a plurality of wheel brake control functions are disclosed. The method includes receiving an indication of an aircraft speed from an aircraft speed indicator, controlling a wheel braking operation of the aircraft according to at least a first wheel brake control function if the aircraft speed indicated by the aircraft speed indicator exceeds a speed threshold, and controlling the wheel braking operation of the aircraft according to at least a second wheel brake control function if the aircraft speed does not exceed the speed threshold. Also disclosed is an aircraft including one or more aircraft wheel brakes and the disclosed braking system.

21 Claims, 11 Drawing Sheets

(51) Int. Cl.
| | |
|---|---|
| B64F 5/60 | (2017.01) |
| F16D 66/00 | (2006.01) |
| F16D 66/02 | (2006.01) |
| B60T 8/17 | (2006.01) |
| B60T 8/58 | (2006.01) |
| B64C 25/42 | (2006.01) |
| B60T 8/171 | (2006.01) |
| B60T 8/32 | (2006.01) |

(52) U.S. Cl.
CPC .............. *B60T 8/58* (2013.01); *B64C 25/426* (2013.01); *B64F 5/60* (2017.01); *F16D 66/00* (2013.01); *F16D 66/021* (2013.01); *B60T 2270/406* (2013.01); *B64C 25/42* (2013.01); *F16D 2066/001* (2013.01); *F16D 2066/006* (2013.01)

(58) Field of Classification Search
CPC ......... B60T 17/22; B60T 8/00; B64C 25/426; B64C 25/42; B64F 5/60; F16D 66/00; F16D 66/021; F16D 2066/001; F16D 2066/006; F16D 55/36; F16D 66/02
USPC ............................................ 701/93; 244/111
See application file for complete search history.

(56) References Cited

U.S. PATENT DOCUMENTS

| | | | |
|---|---|---|---|
| 5,845,975 | A | 12/1998 | Wells |
| 7,673,721 | B2 | 3/2010 | Bailey et al. |
| 9,846,978 | B1 | 12/2017 | Tseng et al. |
| 10,336,473 | B2 | 7/2019 | Bill |
| 10,352,774 | B2* | 7/2019 | Miller ................... B60T 8/1703 |
| 10,597,148 | B2* | 3/2020 | Meinel Cheesman ...................... B64D 13/08 |
| 10,696,382 | B2 | 6/2020 | Bill et al. |
| 10,723,331 | B2 | 7/2020 | Bill et al. |
| 2003/0010583 | A1* | 1/2003 | Arnold .................. B60T 8/1703 188/106 R |
| 2003/0102191 | A1 | 6/2003 | DeVlieg |
| 2004/0220714 | A1* | 11/2004 | Rudd, III ............ B60T 8/17616 701/71 |
| 2005/0040286 | A1* | 2/2005 | Radford .................. B64C 25/46 188/264 R |
| 2005/0067232 | A1 | 3/2005 | Roberts |
| 2006/0108867 | A1* | 5/2006 | Ralea ..................... B60T 13/741 303/152 |
| 2006/0244310 | A1 | 11/2006 | DeVlieg |
| 2007/0251308 | A1 | 11/2007 | Canterbury et al. |
| 2009/0084637 | A1* | 4/2009 | Bailey .................. F16D 66/021 188/1.11 E |
| 2014/0163815 | A1* | 6/2014 | Cahill ..................... F16D 66/00 701/34.4 |
| 2014/0180506 | A1 | 6/2014 | Vaney et al. |
| 2014/0297095 | A1 | 10/2014 | Vaney |
| 2015/0025735 | A1* | 1/2015 | Mylaraswamy ........ B64C 25/42 701/32.9 |
| 2015/0203194 | A1 | 7/2015 | Griffith |
| 2016/0054249 | A1* | 2/2016 | Rateick .................. G01N 27/06 324/693 |
| 2016/0281808 | A1 | 9/2016 | Lamkin et al. |
| 2016/0318492 | A1 | 11/2016 | Miller |
| 2016/0362093 | A1* | 12/2016 | Gadzinski ............... B64C 25/42 |
| 2018/0017467 | A1 | 1/2018 | Hiruta et al. |
| 2018/0290639 | A1* | 10/2018 | Dirgo ..................... B60T 17/22 |
| 2019/0009891 | A1* | 1/2019 | Morris .................. B60T 8/1703 |
| 2019/0017561 | A1* | 1/2019 | Antanaitis ............ B60T 17/221 |
| 2019/0023151 | A1 | 1/2019 | Glinka |
| 2019/0071062 | A1 | 3/2019 | Robere et al. |
| 2019/0299944 | A1* | 10/2019 | Nilsson .................. B60T 13/74 |
| 2019/0329910 | A1* | 10/2019 | Bill ....................... F16D 66/021 |

FOREIGN PATENT DOCUMENTS

| | | | |
|---|---|---|---|
| EP | 0443213 | 8/1991 | |
| EP | 2988120 | 2/2016 | |
| EP | 3088266 | 11/2016 | |
| EP | 3 715 245 | 9/2020 | |
| FR | 2305775 | 10/1976 | |
| FR | 2305775 A | * 11/1976 | .............. B60T 13/68 |
| GB | 2470098 | 11/2010 | |
| GB | 2554097 | 3/2018 | |
| WO | 96/08396 | 3/1996 | |
| WO | 02/12043 | 2/2002 | |
| WO | 2006/072802 | 7/2006 | |
| WO | 2008/097260 | 8/2008 | |
| WO | 2017/062590 | 4/2017 | |

OTHER PUBLICATIONS

Combined Search and Examination Report for United Kingdom Application No. GB 1811178.1, six pages, dated Feb. 25, 2019.
Combined Search and Examination Report for United Kingdom Application No. GB 1817600.8, seven pages, dated Feb. 25, 2019.
Extended European Search Report for European Application No. EP 19159656.8, eight pages, dated May 31, 2019.
Partial European Search Report for European Application No. EP 19159658.4, 16 pages, dated Jul. 11, 2019.
Bacos, M.P. et al., "C/C Composite Oxidation Model—I. Morphological Experimental Investigations", Carbon, vol. 38, pp. 77-92 (2000).
Bacos, M.P. et al., "C/C Composite Oxidation Model—II. Oxidation Experimental Investigations", Carbon, vol. 38, pp. 93-103 (2000).
Bacos, M.P. et al., "C/C Composite Oxidation Model—III. Physical Basis, Limitations and Applications", Carbon, vol. 38, pp. 105-117 (2000).
Gao, Pengzhao et al., "Model-Free Kinetics Applied to the Oxidation Properties and Mechanism of Three-Dimension Carbon/Carbon Composite", Materials Science and Engineering A 432, pp. 226-230 (2006).
Guo and Xiao "Mechanisms and Modeling of Oxidation of Carbon Felt/Carbon Composites", Carbon, vol. 45, pp. 1058-1065 (2007).
Han, J.C. et al., "Oxidation and Ablation of 3D Carbon-Carbon Composite at up to 3000° C.", Carbon, vol. 33, No. 4, pp. 473-478 (1995).
Hollauer, Christian, Dissertation "Modeling of Thermal Oxidation and Stress Effects", Submitted to the Technical University of Vienna, Faculty of Electrical Engineering and Information Technology, Mittermoos 5, A3042 Würmla, Österreich, Austria, Matr. Nr. 9525349, 151 pages, Vienna, Jan. 2007, (Parts 1-5).
Chou and Hou, "Kinetics of High-Temperature Oxidation of Inorganic Nonmetallic Materials" Journal of American Ceramic Society, vol. 92(3), pp. 585-594 (2009).
Hou and Chou, "A Simple Model for the Oxidation of Carbon-Containing Composites", Corrosion Science, vol. 52, pp. 1093-1097 (2010).
Lehigh Unversity, "Wear of Materials", The Tribology Laboratory at Lehigh University, Department of Mechanical Engineering and Mechanics, <https://www.lehigh.edu/intribos/wear.html>, three pages, Feb. 5, 2021.
McKee, D.W. "Oxidation Behavior and Protection of Carbon/Carbon Composites", Carbon, vol. 25, No. 4, pp. 551-557 (1987).
Yen and Ishihara, "On Temperature-Dependent Tribological Regimes and Oxidation of Carbon-Carbon Composites up to 1800° C.", Wear, vol. 196, pp. 254-262 (1996).
Zaeem and Kadiri "An Elastic Phase Field Model for Thermal Oxidation of Metals: Application to Zirconia", Computational Materials Science, vol. 89, pp. 122-129 (2014).
Nonfinal Office Action for U.S. Appl. No. 16/286,028, 39 pages, dated Dec. 22, 2020.
Bevilacqua, M. et al., "A Review of the Catalytic Oxidation of Carbon-Carbon Composite Aircraft Brakes", School of Engineering and Technology, University of Hertfordshire, College Lane, Hatfield, Herts AL10 9AB, United Kingdom, <https://www.researchgate.net/publication/281675828>, 30 pages, available online Aug. 29, 2015.

(56) References Cited

OTHER PUBLICATIONS

Zhang et al., "New Insights into the early stages of thermal oxidation of carbon/carbon composites using electrochemical methods", Carbon, vol. 108, pp. 178-189, (2016).
Office Action issued in U.S. Appl. No. 16/286,028, 35 pages, dated May 11, 2021.
Office Action issued in U.S. Appl. No. 16/286,341, 34 pages, dated Jul. 20, 2021.
Office Action issued in U.S. Appl. No. 16/286,341, 42 pages, dated Aug. 10, 2021.

* cited by examiner

AIRCRAFT BRAKING

CROSS RELATED APPLICATIONS

This application claims priority to United Kingdom (GB) Patent Application 1803203.7, filed Feb. 27, 2018, and United Kingdom (GB) Patent Application 1811179.9, filed Jul. 6, 2018, the entire contents of each of which are hereby incorporated by reference.

TECHNICAL FIELD

The present invention relates to aircraft braking. In particular, although not exclusively, the present invention relates to controlling aircraft braking according to at least one of a plurality of wheel brake control functions.

BACKGROUND

Aircraft wheel brakes may be controlled by a braking system. The way in which the braking system applies the aircraft wheel brakes may affect the behaviour of the aircraft during braking and its operational efficiency. It may be desired to provide a braking system for an aircraft which controls the aircraft wheel brakes in a safe and efficient manner.

SUMMARY

A first aspect of the present invention provides a braking system for an aircraft operable to apply one or more aircraft wheel brakes according to at least one of a plurality of wheel brake control functions, the braking system comprising: an aircraft speed indicator; and a controller configured to: control a wheel braking operation of the aircraft according to at least a first wheel brake control function if the aircraft speed indicated by the aircraft speed indicator exceeds a speed threshold; and control the wheel braking operation of the aircraft according to at least a second wheel brake control function if the aircraft speed does not exceed the speed threshold.

Optionally, the braking system comprises a brake condition indicator, wherein the controller is configured to select the second wheel brake control function, from the plurality of wheel brake control functions, according to a condition of the one or more aircraft wheel brakes.

Optionally, the brake condition indicator comprises a brake temperature characteristic indicator; and the brake condition comprises a temperature characteristic of the one or more aircraft wheel brakes.

Optionally, the controller is configured to select the second wheel brake control function based on the temperature characteristic of the one or more aircraft wheel brakes.

Optionally, the temperature characteristic comprises a temperature of the one or more aircraft wheel brakes; and the controller is configured to select a brake cooling time harmonising function as the second wheel brake control function if the temperature of at least one aircraft wheel brake is above a dispatch temperature threshold.

Optionally, the brake cooling time harmonising function causes the amount of braking provided by each of the aircraft wheel brakes to be controlled such that a predicted time to cool to the dispatch temperature threshold for all of the one or more aircraft wheel brakes is about the same.

Optionally, the controller is configured to select a thermal oxidation limiting function as the second wheel brake control function if the temperature characteristic of at least one aircraft wheel brake meets a thermal oxidation limiting criterion.

Optionally, the thermal oxidation limiting function causes the at least one aircraft wheel brake to be disabled.

Optionally, the controller is configured to select a brake wear reduction function as the second wheel brake control function if the temperature of at least one aircraft wheel brake is not above the dispatch temperature threshold.

Optionally, the brake wear reduction function causes the number of times the one or more aircraft wheel brakes are applied to be controlled.

Optionally, the brake condition indicator further comprises a brake wear indicator and a brake thermal oxidation state indicator; and the brake condition further comprises an amount of brake wear of the one or more aircraft wheel brakes, and a thermal oxidation state of the one or more aircraft wheel brakes.

Optionally, the controller is configured to select the brake wear reduction function or a thermal oxidation harmonising function as the second wheel brake control function, if the temperature of at least one aircraft wheel brake is below the dispatch temperature threshold, based on the amount of brake wear and the thermal oxidation state of the one or more aircraft wheel brake.

Optionally, the controller is configured to control the wheel braking operation according to the first wheel brake control function and the brake wear reduction function, when the brake wear reduction function is selected as the second wheel brake control function.

Optionally, the first wheel brake control function is a torque equalisation function.

Optionally, the torque equalisation function causes the wheel braking operation to be controlled such that the distribution of the torque reacted by the one or more aircraft wheel brakes that are applied is symmetric across the aircraft and/or across a part of the aircraft with respect to a direction of travel of the aircraft.

Optionally, the controller is configured to select a brake wear reduction function or a thermal oxidation harmonising function as the second control function.

A second aspect of the present invention provides an aircraft comprising: one or more aircraft wheel brakes; and a braking system arranged to apply the one or more aircraft wheel brakes according to the first aspect.

A third aspect of the present invention provides a method of applying one or more aircraft wheel brakes according to at least one of a plurality of wheel brake control functions, the method comprising: receiving an indication of an aircraft speed from an aircraft speed indicator; controlling a wheel braking operation of the aircraft according to at least a first wheel brake control function if the aircraft speed indicated by the aircraft speed indicator exceeds a speed threshold; and controlling the wheel braking operation of the aircraft according to at least a second wheel brake control function if the aircraft speed does not exceed the speed threshold.

Optionally, the method according to the third aspect comprises: receiving an indication of a condition of the one or more aircraft wheel brakes from a brake condition indicator; and selecting the second wheel brake control function, from the plurality of wheel brake control functions, according to the condition of the one or more aircraft wheel brakes.

Optionally, in the method according to the third aspect: the brake condition indicator comprises a brake temperature characteristic indicator; and the brake condition comprises a temperature characteristic of the one or more aircraft wheel brakes.

Optionally, the method according to the third aspect comprises: selecting the second wheel brake control function based on the temperature characteristic of the one or more aircraft wheel brakes.

Optionally, in the method according to the third aspect: the temperature characteristic comprises a temperature of the one or more aircraft wheel brakes; the method comprises selecting a brake cooling time harmonising function as the second wheel brake control function if the temperature of at least one aircraft wheel brakes is above a dispatch temperature threshold.

Optionally, in the method according to the third aspect, the brake cooling time harmonising function causes the amount of braking provided by each of the aircraft wheel brakes to be controlled such that a predicted time to cool to the dispatch temperature threshold for all of the one or more aircraft wheel brakes is about the same.

Optionally, in the method according to the third aspect: the method comprises selecting a thermal oxidation limiting function as the second wheel brake control function if the temperature characteristic of at least one aircraft wheel brake meets a thermal oxidation limiting criterion.

Optionally, the thermal oxidation limiting function causes the at least one aircraft wheel brake to be disabled.

Optionally, in the method according to the third aspect: the method comprises selecting a brake wear reduction function as the second wheel brake control function if the temperature of at least one aircraft wheel brake is not above the dispatch temperature threshold.

Optionally, the brake wear reduction function causes the number of times the one or more aircraft wheel brakes are applied to be controlled.

Optionally, in the method according to the third aspect: the brake condition indicator further comprises a brake wear indicator and a brake thermal oxidation state indicator; and the brake condition further comprises an amount of brake wear of the one or more aircraft wheel brakes, and a thermal oxidation state of the one or more aircraft wheel brakes.

Optionally, the method comprises selecting the brake wear reduction function or a thermal oxidation harmonising function as the second wheel brake control function, if the temperature of at least one aircraft wheel brake is not above the dispatch temperature threshold, based on the amount of brake wear and the thermal oxidation state of the one or more aircraft wheel brakes.

Optionally, the method according to the third aspect comprises controlling the wheel braking operation according to the first wheel brake control function and the brake wear reduction function, when the brake wear reduction function is selected as the second wheel brake control function.

Optionally, in the method according to the third aspect: the first wheel brake control function is a torque equalisation function.

Optionally, in the method according to the third aspect, the torque equalisation function causes the wheel braking operation to be controlled such that the distribution of the torque reacted by the one or more aircraft wheel brakes that are applied is symmetric across the aircraft and/or across a part of the aircraft with respect to a direction of travel of the aircraft.

Optionally, the method according to the third aspect comprises selecting a brake wear reduction function or a thermal oxidation harmonising function as the second control function.

A fourth aspect of the present invention provides a braking system for an aircraft operable to apply a plurality of aircraft wheel brakes, the braking system comprising: a controller configured to: control the application of a brake of the plurality of brakes based on its respective thermal oxidation state relative to the respective thermal oxidation states of the other brakes.

Optionally, in the braking system according to the fourth aspect, the controller is configured to: control each of the plurality of brakes such that each brake reaches a respective thermal oxidation threshold at about the same time.

A fifth aspect of the present invention provides a braking system for an aircraft operable to apply a plurality of aircraft wheel brakes, the braking system comprising: a controller configured to: control the application of a brake of the plurality of brakes based on its respective predicted time to cool to a dispatch temperature threshold relative to the respective predicted times to cool to the dispatch temperature threshold of the other brakes.

Optionally, in the braking system according to the fifth aspect, the controller is configured to: control each of the plurality of brakes such that the predicted time to cool to the dispatch temperature threshold for all of the plurality of brakes is about the same.

BRIEF DESCRIPTION OF THE DRAWINGS

Embodiments of the invention will now be described, by way of example only, with reference to the accompanying drawings, in which.

DETAILED DESCRIPTION

Figure 1:
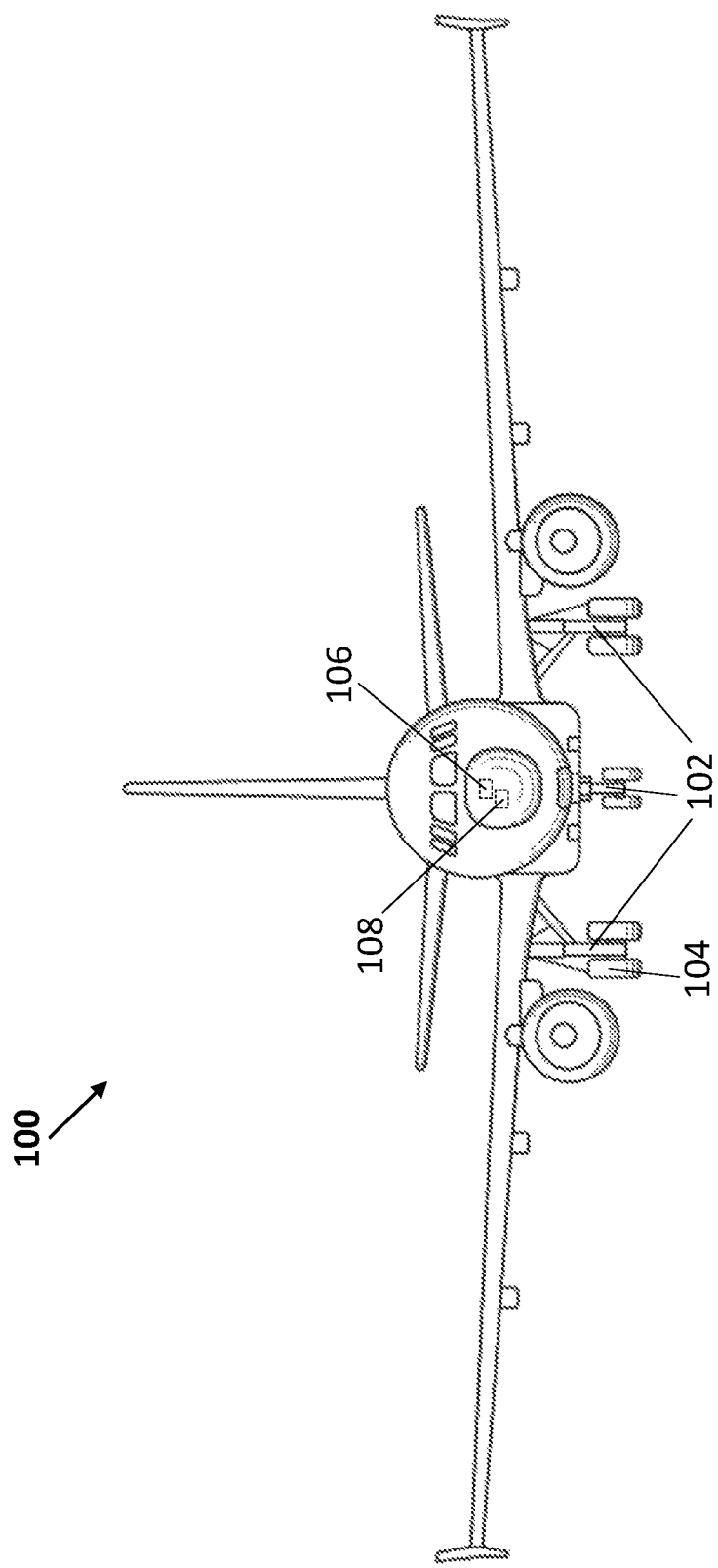
FIG. 1 is a schematic diagram of an aircraft on which examples may be deployed.

FIG. 1 is a simplified schematic view of an aircraft 100. The aircraft 100 comprises a plurality of landing gear assemblies 102. The landing gear assemblies 102 may include main and nose landing gears that may be extended during take-off and landing and retracted during flight. Each landing gear assembly 102 includes wheels such as wheel 104. The aircraft 100 comprises a computing system 106 which may, for example, comprise one or more processors and one or more computer readable storage media. The aircraft 100 may also comprise instruments 108, such as instruments or sensors for measuring characteristics or parameters related to the aircraft, and instruments or sensors for measuring environmental characteristics. It should be appreciated that, in some examples, the instruments 108 may be distributed at various different locations of the aircraft 100. The aircraft 100 also comprises one or more aircraft wheel brake assemblies (not shown in FIG. 1) to provide braking to inhibit the rotational motion of the wheels such as the wheel 104.

Figure 2:
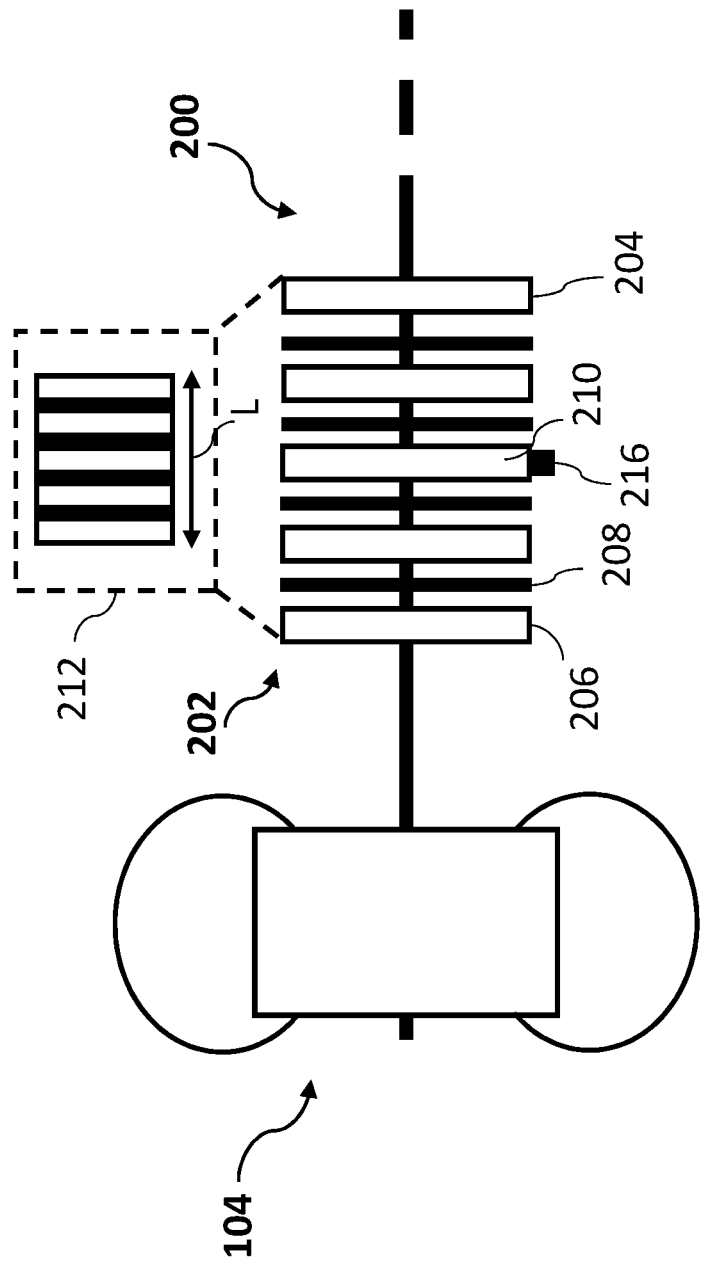
FIG. 2 is a schematic diagram of a brake assembly and a wheel of an aircraft landing gear assembly according to an example.

FIG. 2 is a simplified schematic view of an aircraft wheel brake assembly 200 associated with the wheel 104 of the aircraft 100. Aircraft wheel brake assemblies are hereafter referred to as "brake assemblies". Each of the wheels of the aircraft 100 may have a brake assembly 200 associated with it. The aircraft 100 may therefore comprise one or more brake assemblies 200. The brake assembly 200 applies a braking force to inhibit the rotation of the wheel 104. In this example, the brake assembly 200 comprises a plurality of brake discs 202 including a pressure plate 204, a reaction plate 206, and a number of rotors and stators such as the rotor 208 and the stator 210. In this example, the brake discs 202 include a plurality of rotors and stators, and the brake assembly 200 is therefore a multiple disc brake. In other examples, the brake assembly 200 may not be a multiple-disc brake. It will be understood that the type of brake used in an aircraft landing gear depends on the characteristics of the aircraft in question, such as size, carrying capacity and the like.

When the aircraft 100 travels along the ground supported by the landing gear 102, the rotors rotate with the wheel 104, whereas the stators, the pressure plate 204 and the reaction plate 206 do not rotate with the wheel 104. When braking is applied, the pressure plate 204 is urged towards the reaction plate 206 so that the brake discs 202 come into contact with one another (as shown in box 212 of FIG. 2) and friction acts to inhibit the rotational motion of the rotors, thus generating a braking force.

Figure 3:
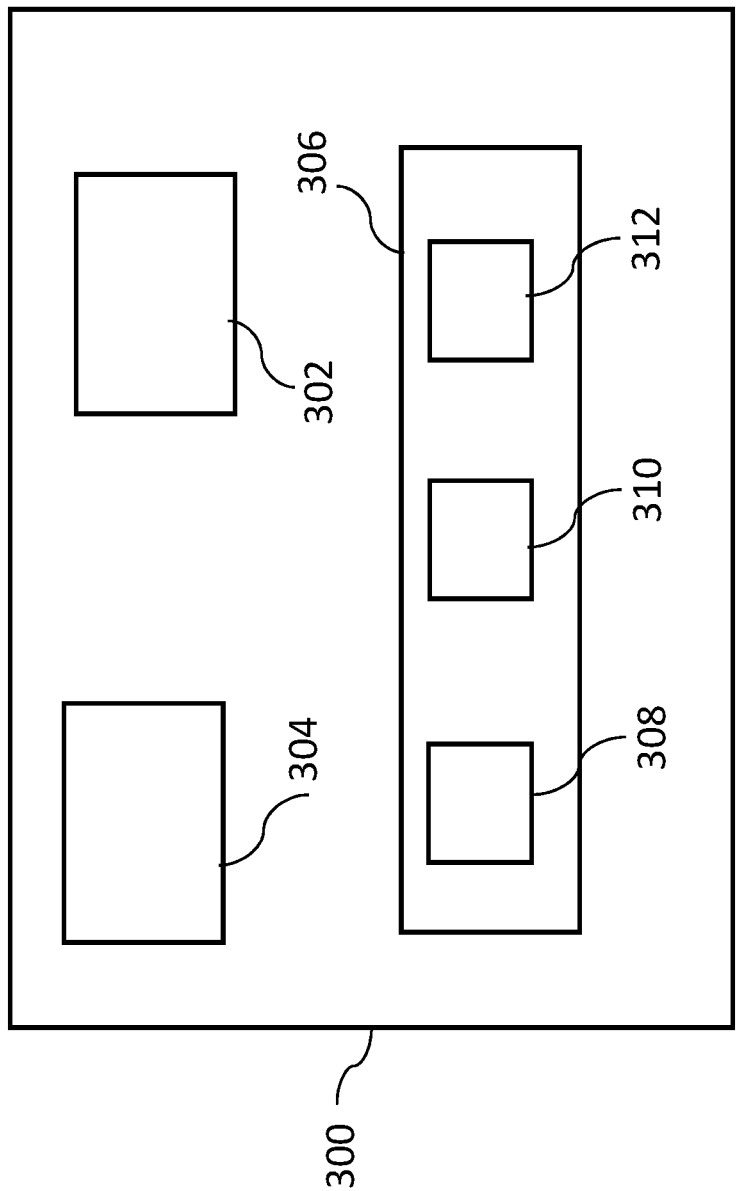
FIG. 3 is a schematic diagram of a braking system of an aircraft according to an example.

FIG. 3 is a simplified schematic view of a braking system 300 for an aircraft, such as the aircraft 100, operable to apply one or more aircraft wheel brakes such as the brake assemblies 200. The braking system 300 causes the brake assemblies 200 to be applied in response to a braking request (e.g. when a pilot of the aircraft 100 presses a brake pedal). For example, one or more of the brake assemblies 200 may be hydraulically actuated or electrically actuated, and the braking system 300 may control the brake actuation system (not shown) to apply the brake assemblies 200. The braking system 300 may communicate with the brake actuation system via a wireless or wired communication link.

The braking system 300 is operable to apply one or more aircraft wheel brakes, such as the brake assemblies 200, according to at least one of a plurality of wheel brake control functions (a wheel brake control function may hereafter be referred to as a "control function"). In this example, the braking system 300 comprises an aircraft speed indicator 302 and a controller 304. The aircraft speed indicator provides an indication of the speed of the aircraft 100. The aircraft speed indicator provides an indication of the aircraft speed to the controller 304.

Apart from the aircraft speed indicator 302, the braking system 300 may also include one or more other indicators described hereafter. Each indicator may provide an indication of a respective parameter relating to the aircraft 100 or the brake assemblies 200. Each indicator may include a respective sensor for measuring the respective parameter. For example, the aircraft speed indicator 302 may comprise an aircraft speed sensor included in the instruments 108.

In some examples, the respective sensor may provide the indication of the respective parameter to the controller 304 via a wired or wireless communication link. In some examples, one or more of the indicators included in the braking system 300, such as the aircraft speed indicator 302, may comprise a processor which receives the indication of the respective parameter from the respective sensor via a wired or wireless communication link. The processor of the one or more indicators may then transmit the respective parameter to the controller 304 via a wired or wireless communication link. The processor of the one or more indicator may be a processor included in the computing system 106.

In some examples, the one or more indicators, alternatively or in addition to a processor, comprise a computer readable storage medium in which information regarding the respective parameter is stored. For example, the respective sensor or processor of the one or more indicators may write information relating to the respective parameters to said computer readable storage medium. The controller 304 may read the temperature information from said storage medium. The computer readable storage medium of the one or more indicators may be a computer readable storage medium included in the computing system 106.

The controller 304 may receive an indication of one or more respective parameters from the one or more indicators in real time. The controller 304 may continuously receive an indication of one or more respective parameters, or, alternatively, may periodically receive discrete items of information relating to the one or more respective parameters. In some examples, the controller 304 may request an indication of one or more of the parameters from the respective indicators and receive the requested indication in response.

The controller 304 is configured to control a wheel braking operation of the aircraft 100 according to at least a first control function if the aircraft speed indicated by the aircraft speed indicator exceeds a speed threshold. On the other hand, the controller 304 is configured to control the wheel braking operation of the aircraft 100 according to at least a second control function if the aircraft speed does not exceed the speed threshold. The wheel braking operation (hereafter "braking operation") involves the application of one or more of the brake assemblies 200 in response to a braking request. For example, a braking request may include information relating to a requested braking intensity. A braking operation may involve applying one or more of the brake assemblies 200 so as to provide the requested braking intensity.

A control function determines which of the brake assemblies 200 are applied and the order, amount of time, brake pressure, etc. of the application of each brake assembly 200 in order to provide the requested braking intensity. For example, a control function may determine such aspects of the wheel braking operation in order to prioritise a braking characteristic or a condition of the brake assemblies 200 used in the wheel braking operation. Further details and examples of control functions are described hereafter.

Figure 4A:
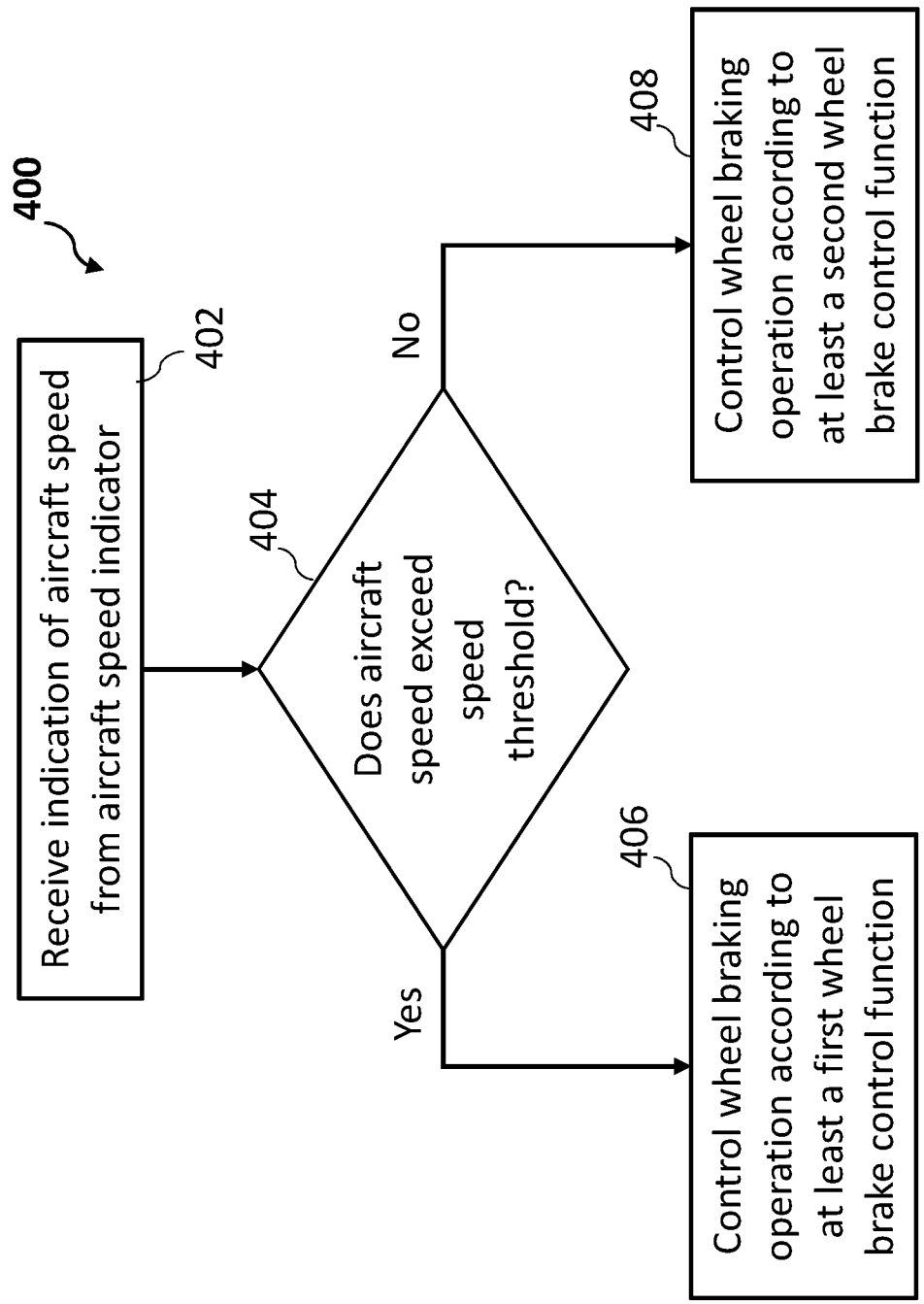
FIG. 4a is a first flow diagram of a method of applying one or more aircraft wheel brakes according to an example.

FIG. 4a is a flow diagram illustrating a method 400 performed by the controller 304 of applying one or more brake assemblies 200 according to at least one of a plurality of control functions. At block 402, an indication of the speed of the aircraft is received from the aircraft speed indicator 302. For example, the controller 304 receives the indication of the aircraft speed from the aircraft speed indicator 302 as previously described.

As indicated by block 404, if the aircraft speed indicated by the aircraft speed indicator 302 exceeds the speed threshold, the method 400 proceeds to block 406. At block 406, the wheel braking operation of the aircraft 100 is controlled according to at least the first control function. On the other hand, as indicated by block 404, if the aircraft speed does not exceed the speed threshold, the method 400 proceeds to block 408. At block 408, the wheel braking operation of the aircraft 100 is controlled according to at least the second control function.

The first control function may be a torque equalisation function. The controller 304 may control the braking operation according to the torque equalisation function if the aircraft speed is above the speed threshold. The torque equalisation function may cause the wheel braking operation to be controlled such that the distribution of the torque reacted by the one or more aircraft wheel brakes that are applied is symmetric across the aircraft and/or across a part of the aircraft with respect to a direction of travel of the aircraft. For example, the amounts of torque reacted by the brake assemblies may be distributed symmetrically across the aircraft 100 with respect to the direction of travel. For example, if the aircraft 100 is traveling in a forward direction without turning, the torque equalisation function may control the braking operation so that the brake assemblies 200 on the left side of the aircraft 100 that are applied react about the same total amount of torque as the brake assemblies 200 on the right side of the aircraft 100 that are applied. In some such examples, the torque equalisation function may cause each of the brake assemblies 200 that are applied to react about the same amount of torque. This may, for example, be the case if the aircraft 100 is travelling in the forward direction and a symmetric distribution of brake assemblies 200 is applied with respect to the direction of travel.

The torque equalisation function may control the braking operation to provide a symmetric distribution of reacted torque when an asymmetric distribution of brake assemblies with respect to the direction of travel is employed by causing different brake assemblies to react respective different amounts of torque, as required. In some examples, the distribution of reacted torque may be symmetric across individual landing gear with respect to the direction of travel. For example, the torque equalisation function may control the brake assemblies 200 of a given landing gear that are applied so that there is a symmetric distribution of torque reacted by those brake assemblies 200 with respect to the direction of travel. This may avoid asymmetric loading of that given landing gear. In some examples, where a symmetric distribution of the brake assemblies 200 of the given landing gear is applied, the torque equalisation function causes the brake assemblies of the given landing gear to react about the same amount of torque. The torque equalisation function may control the braking operation when the aircraft 100 is turning. In some such examples, the torque equalisation function may not provide a symmetric distribution of reacted torque across the aircraft 100 with respect to the forward direction. However, in these examples, the torque equalisation function may control the distribution of torque across individual landing gears as described.

To control the torque reacted by a given brake assembly 200, the braking pressure applied to the given brake assembly 200 may be adjusted based on the amount of torque reacted by that given brake assembly 200. For example, the instruments 108 may include a torque sensor associated with each brake assembly 200. The torque sensors may comprise any suitable torque sensing devices or systems. The torque sensors may be configured to measure torque directly, or alternatively may be configured to measure a quantity from which torque can be derived (such as force). For example, the torque sensors can comprise an optical-fibre based sensor, such as a Fibre Bragg Grating (BFG) sensor; a strain gauge, a force sensor, or any other sensor suitable for measuring torque or a quantity from which torque can be derived. On an aircraft where the brake torque is reacted via a torque pin and/or a torque rod (for example, aircraft having a classic bogie arrangement), the torque sensors can comprise an instrumented Torque Pin to sense shear force, located in the interface between a brake lug and a brake torque rod. Alternatively, optical torque sensors could be used to measure torque in respective axles to which the brake assemblies 200 are mounted.

When the controller 304 controls the braking operation according to the torque equalisation function, the controller 304 may receive torque measurements from respective torque sensors of each of the brake assemblies 200 that are applied during the braking operation. As described, the torque sensors may measure a quantity from which the torque can be derived. In such examples, the controller 304 may derive the amount of torque reacted by respective brake assemblies 200. The controller 304 may receive the torque measurements as previously described.

Based on the received torque measurements, the controller 304 may adjust the braking pressure of the brake assemblies 200 that are applied to obtain the desired distribution of the reacted torque. Controlling the distribution of reacted torque may be desired so that the direction of travel and/or the orientation of the aircraft 100 is not affected by the braking operation. Controlling reacted torque distribution may also be desired to avoid asymmetric loading of certain components of the aircraft 100. The controller 304 may implement a control loop in order to adjust the braking pressure based on the respective torque measurements. For example, the controller 304 may implement a Proportional-Integral-Derivative (PID) loop, or any other suitable loop to control the braking pressure to control the distribution of the torque amongst the applied brake assemblies 200. The controller 304 may receive the torque measurements at a high rate, for instance, between $10^2$ to $10^3$ times per second, and may adjust the braking pressure at similar rates.

The speed threshold may be set at a level at which controlling torque distribution becomes a priority over other braking characteristics or controlling the condition of the brake assemblies 200. For example, that the direction or orientation of the aircraft 100 is not affected and/or asymmetric loading of aircraft components is avoided may be a priority at relatively high speeds. In some examples, the speed threshold may be set to a speed associated with taxi operations, for example, the speed threshold may be between 10 knots and 50 knots. In one particular example, the speed threshold may be 30 knots. The speed threshold may be set based on the mass or weight distribution of the aircraft 100, for example. The speed threshold may also be set based on the expected taxiing route of the aircraft 100.

If the aircraft speed is below the speed threshold, the controller 304 may select a different control function to control the braking operation. The second control function may be any one of a brake cooling time harmonising function, a thermal oxidation limiting function, a brake wear reduction function or a thermal oxidation harmonising function. For example, the controller 304 may select one of the brake cooling time harmonising function, the thermal oxidation limiting function, the brake wear reduction function or the thermal oxidation harmonising function as the second control function to control the braking operation. These control functions are described in further detail hereafter. In one example, the controller 304 selects the brake wear reduction function if the aircraft speed is below the speed threshold.

Referring again to FIG. 3, the braking system 300 may comprise a brake condition indicator 306. The controller 304 may be configured to select the second control function, from the plurality of wheel brake control functions, according to a condition of the brake assemblies 200. For example, the controller 304 may receive an indication of the condition of the brake assemblies 200 from the brake condition indicator 306, and may select the second control function according to the condition of the brake assemblies 200. The brake condition indicator 306 may comprise a brake temperature characteristic indicator 308. In such examples, the brake condition may comprise a temperature characteristic of the brake assemblies 200. The controller 304 may be configured to select the second control function based on the temperature characteristic of the brake assemblies 200.

The temperature characteristic may comprise the temperatures of the brake assemblies 200. The temperatures of the brake assemblies 200 may specifically be the temperatures of the respective brake discs 202. The brake temperature characteristic indicator may comprise a temperature sensor 216 associated with each brake assembly 200 (see FIG. 2). The temperature sensors 216 may be part of the instruments 108. The temperature sensors 216 may be provided in thermal contact with one of the brake discs of each brake assembly 200. In the example of FIG. 2, the temperature sensor 216 is provided on the stator 210. In this example, the stator 210 is the brake disc likely to reach the highest temperatures. The temperature sensor 216 may be any type of temperature sensor suitable for use in an aircraft brake assembly. For example, the temperature sensor 216 is able to function properly at the temperature ranges likely to be reached by the brake discs 202. For example, the temperature sensor 216 may be a thermocouple, a surface acoustic wave (SAW) sensor, an eddy current sensor, a resistance thermal sensor, a strain gauge, or the like. If a temperature sensor is provided on a part of a given brake assembly 200 other than on one of the brake discs 202, the temperature of the brake discs 202 may be determined using an indication of the relationship between a temperature measured by said temperature sensor and the temperature of the brake discs 202. In some examples, the indication of the relationship may be determined by experiment. In some examples, the indication of the relationship may be determined using a brake thermal model. In some examples, the temperature characteristic may also include rates of increase of temperature of the brake assemblies 200.

In some examples, the brake temperature characteristic indicator 308 may comprise a brake temperature prediction function (e.g. implemented by a processor of the brake temperature characteristic indicator 308). The brake temperature prediction function may predict the temperatures of the brake assemblies 200 based on the energy input into the brake assemblies 200 during a braking operation. Using the energy input into a given brake assembly 200, the mass of the given brake assembly 200 and the specific heat capacity of the given brake assembly 200, a change in temperature of the given brake assembly 200 caused by the input energy can be determined. The temperature of the given brake assembly 200 may then be determined using the temperature change, i.e. by adding it to an initial temperature. The initial temperature before the braking operation may be known from previous iterations of such a calculation. On the other hand, if the energy input is due the first brake application of the day (i.e. the given brake assembly 200 has not been applied for a significant amount of time), the initial temperature may be taken to be the environmental temperature.

The energy input into a given brake assembly 200 may be determined using measurements from instruments included in instruments 108. The instruments 108 may include a torque sensor as previously described. The instruments 108 may also include a tachometer for measuring the rotational speed of the wheel 104 associated with the given brake assembly 200. In such examples, the energy input into the given brake assembly 200 is calculated by integrating the product of the wheel speed and torque over time.

In some examples, the brake thermal model (e.g. a computational fluid dynamics model) may be used to predict a temperature of the given brake assembly 200 given an amount of energy input into the given brake assembly 200. For example, the physical properties of the given brake assembly 200 (e.g. mass, heat capacity, etc.), environmental characteristics and the energy input into the given brake assembly 200 may be input into the brake thermal model, and the brake thermal model may output a predicted temperature of the given brake assembly 200. The environmental characteristics may include ambient temperature (e.g. in the vicinity of the given brake assembly 200), wind conditions, or other characteristics which may affect the temperature of the given brake assembly 200. The environmental characteristics may be measured by instruments included in instruments 108, for example.

In some examples, the rate of increase of temperatures of the brake assemblies 200 may be predicted based on the energy input into the brake assemblies 200 by the brake temperature prediction function. For example, the rate of increase may be predicted based on the energy input into a given brake assembly 200 and the physical properties of the given brake assembly 200 using the brake thermal model.

Figure 4B:
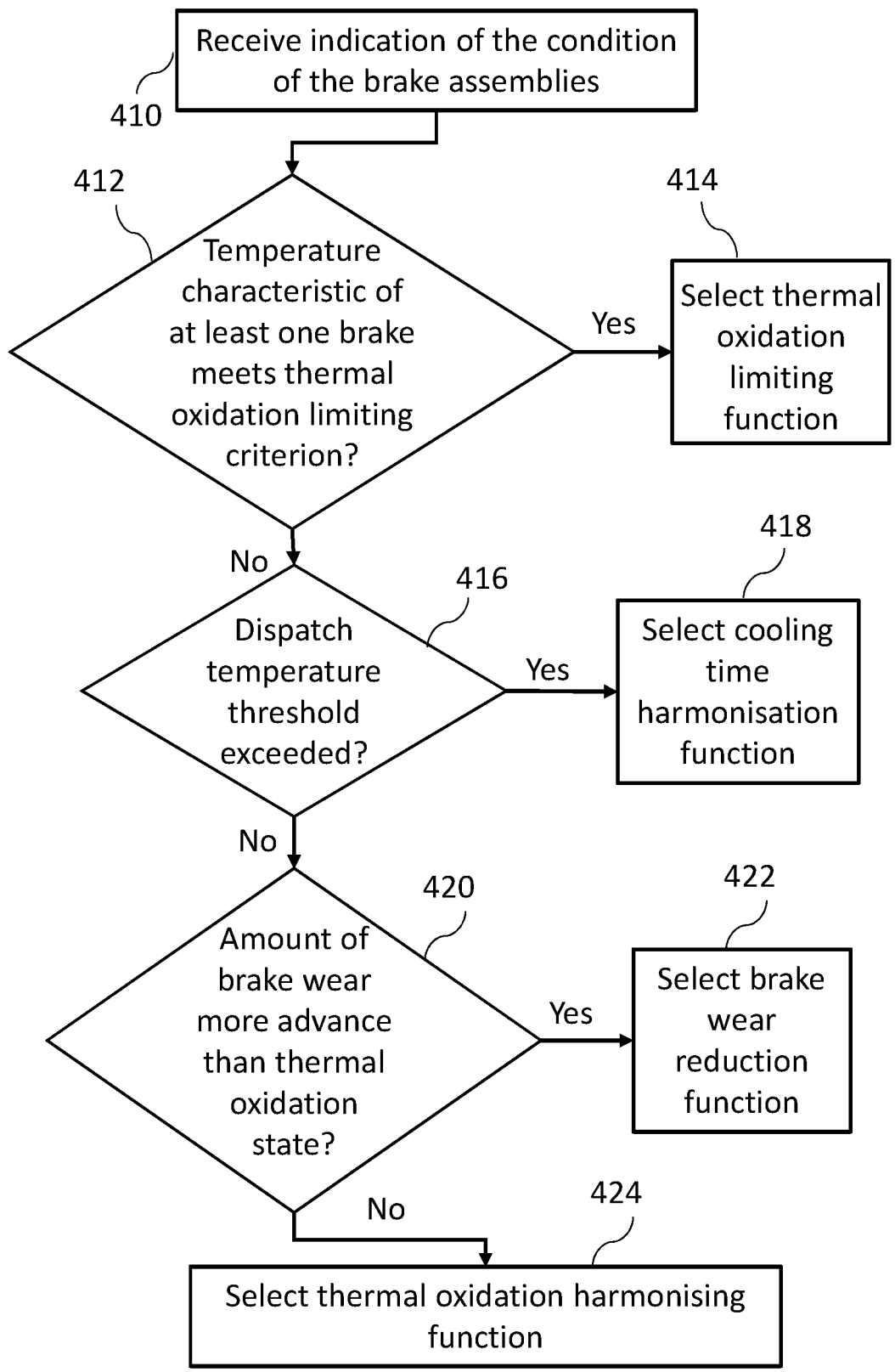
FIG. 4b is a second flow diagram of a method of applying one or more aircraft wheel brakes according to an example.

FIG. 4b is a flow diagram illustrating further blocks which may be performed as part of the method 400. The blocks shown in FIG. 4b may be part of block 408 at which the wheel braking operation is controlled according to at least a second control function. At block 410, an indication of the condition of the brake assemblies 200 is received from the brake condition indicator 306. For example, the controller 304 receives the indication of the condition from the brake condition indicator 306. For example, at block 410, the controller 304 receives the temperature characteristic of the brake assemblies 200.

As indicated by block 412, if the temperature characteristic of at least one brake assembly 200 meets a thermal oxidation limiting criterion, the method 400 may proceed to block 414. At block 414, the thermal oxidation limiting function is selected as the second control function. For example, the controller 304 is configured to select the thermal oxidation limiting function as the second control function. The thermal oxidation limiting function causes the at least one brake assembly 200 (which meets the thermal oxidation limiting criterion) to be disabled.

Each brake assembly 200 may have its own thermal oxidation limiting criterion. The temperature characteristic of a given brake assembly 200 may meet the respective thermal oxidation limiting criterion if the temperature of the given brake assembly 200 exceeds a temperature trigger point. Any one or more of the rotors, stators, pressure plate 204 and the reaction plate 206 may be composed of Carbon-Carbon (CC) composites. A brake including brake discs composed of CC composites may be referred to as a carbon brake. For example, the brake discs 202 may be composed of a graphite matrix reinforced by carbon fibers. During use, the brake discs 202 may reach high temperatures. Thermal oxidation of the brake discs 202 may occur at high temperatures. During a thermal oxidation reaction, oxygen reacts with the carbon of the brake discs 202 causing carbon atoms to be removed from the brake discs 202 as carbon dioxide and/or carbon monoxide is produced leading to a loss of mass.

The temperature trigger point for the given brake assembly 200 may be a temperature value at which thermal oxidation of the given brake assembly (specifically, thermal oxidation of the CC composite components) is expected to occur. In some examples, the temperature trigger point may be between 400° C. and 750° C. In some examples, the thermal oxidation limiting criterion may alternatively or in addition include a temperature increase rate threshold. In such examples, where the temperature characteristic includes a rate of increase of temperature of the given brake assembly 200, the thermal oxidation limiting criterion may be met if the rate of increase of temperature exceeds the temperature increase rate threshold.

For example, if the given brake assembly 200 is disabled, the controller 304 may assign a "disabled" status to it. That the given brake assembly 200 is disabled means that when the braking system 300 receives a braking request, the braking system 300 does not cause the given brake assembly 200 to be applied. The required braking may instead be provided by other brake assemblies associated with the other wheels of the respective landing gear 102. The given brake assembly 200 may not be disabled irrespective of whether or not the thermal oxidation limiting criterion is met if, for example, use of the given brake assembly 200 is required to provide the requested amount of braking in a safe manner. In some examples, the given brake assembly 200 may not be disabled if the aircraft 100 is required to decrease its speed rapidly (e.g. if a high braking intensity is requested by the pilot of the aircraft 100)

If the given brake assembly 200 has been disabled and its temperature characteristic no longer meets the thermal oxidation limiting criterion, the controller 304 may change the status of the given brake assembly 200 from "disabled" to "enabled". The given brake assembly 200 when enabled may once again be employed by the braking system 300 to provide braking responsive to a braking request. The thermal oxidation limiting function limits use of the brake assemblies which meet certain temperature conditions (i.e. the thermal oxidation limiting criterion), so that further thermal oxidation of those brake assemblies may be reduced or inhibited.

The thermal oxidation limiting function may cause the controller 304 to determine whether the temperature of any of the brake assemblies 200 meets the respective thermal oxidation limiting criterion. For example, the controller 304 may determine whether the thermal oxidation limiting criterion is met in real-time, during aircraft operation. The thermal oxidation limiting function may control braking as described in real-time depending on the thermal oxidation limiting criterion being met. For instance, the controller 304 may determine whether the thermal oxidation limiting criterion is met repeatedly at a fast rate, with the temperature of the brake assemblies 200 being sampled multiple times per second, up to the sampling rates of the respective temperature sensors 216. In some examples, the controller 304 may receive an indication about whether or not the respective thermal oxidation limiting criterion is met from an apparatus configured to provide such indications.

The thermal oxidation limiting criterion may depend on the thermal oxidation state of the respective brake assembly 200. How the thermal oxidation state of the brake assemblies 200 may be determined is described hereafter. For example, the temperature trigger point may be a relatively lower temperature value if the thermal oxidation state of the respective brake assembly 200 is more advanced. In this way, a given brake assembly 200 may be disabled if it meets certain temperature conditions that depend on the thermal oxidation state of the given brake assembly 200.

As indicated by block 412, if the temperature characteristic of at least one brake assembly 200 does not meet the respective thermal oxidation limiting criterion, the method 400 may proceed to block 416. As indicated by block 416, if the temperature of at least one of the brake assemblies 200 is above a dispatch temperature threshold, the method 400 may proceed to block 418. At block 418, the brake cooling time harmonising function is selected as the second control function. For example, the controller 304 is configured to select the brake cooling time harmonising function as the second control function at block 418.

The cooling time harmonising function causes the controller 304 to control the application of a given brake assembly 200 based on its respective predicted time to cool to the dispatch temperature threshold relative to the respective predicted times to cool to the dispatch temperature threshold of the other brake assemblies 200. For example, the given brake assembly 200 may be applied based on how long it is predicted to take to reach the dispatch temperature threshold compared to how along other brake assemblies 200 are predicted to take to reach the dispatch temperature threshold. More specifically, the brake cooling time harmonising function may cause the amount of braking provided by each of the brake assemblies 200 to be controlled such that the predicted time to cool to the dispatch temperature threshold for all of the brake assemblies is about the same. The dispatch temperature threshold may be set to a safe dispatch temperature. The safe dispatch temperature may be used to ensure that the brake assemblies 200 are sufficiently cool for use in the next flight cycle. For example, the aircraft 100 may be allowed to embark on a flight once the brake assembly temperatures are at or below the safe dispatch temperature. In some examples, the dispatch temperature threshold may be a temperature value close to the safe dispatch temperature. The safe dispatch temperature (and therefore the dispatch temperature threshold) may vary depending on the characteristics of the airports between which the aircraft 100 is to fly. For example, the safe dispatch temperature may depend on taxiing routes, lengths of runways, etc. In some examples, the safe dispatch temperature may be in the range 200° C. to 600° C. and the dispatch temperature threshold may be set to a temperature in the range 200° C. to 600° C. In some examples, the dispatch temperature threshold may be 300° C.

The cooling time harmonising function determines a predicted time to cool to the dispatch temperature threshold for each brake assembly 200. For example, the cooling time harmonising function receives the temperature of each brake assembly 200 from the brake temperature characteristic indicator 308 and predicts the amount of time required for each brake assembly 200 to cool to the dispatch temperature threshold. It will be appreciated that the time to cool may depend on the local environmental conditions.

Given the temperature of a given brake assembly 200 and the dispatch temperature threshold, the cooling time harmonising function may predict a respective time to cool based on the physical properties of the given brake assembly 200 and the environmental temperature. The physical properties may include the mass, the specific heat capacity and the heat transfer coefficient of the given brake assembly 200. In some examples, the heat transfer coefficient of the given brake assembly 200 may be determined by experiment (or known from the manufacturer of the given brake assembly 200), and verified using simulations of the given brake assembly 200. For example, simulations may be performed using the brake thermal model previously described. In some example, the time to cool may be predicted directly from the brake thermal model.

The physical properties of the brake assemblies 200 (e.g. heat transfer coefficient) may be stored in a computer readable storage medium of the computing system 106, and may be retrieved by the controller 304 when the controller 304 is controlling the braking operation according to the cooling time harmonising function, as required.

The cooling time harmonising function distributes the braking amongst the brake assemblies so that each brake assembly 200 reaches the dispatch temperature threshold at about the same time. For example, during the braking operation which is being controlled according to the cooling time harmonising function, the brake assemblies 200 with the shortest predicted time to cool may be used first. The cooling time harmonising function may adjust the braking distribution in real-time during the braking operation. The cooling time harmonising function may determine the time to cool to the dispatch temperature threshold for each brake assembly 200 and adjust the braking distribution repeatedly at a fast rate, with the temperatures of the brake assemblies 200 being sampled multiple times per second, up to the sampling rates of the respective temperature sensors. In a simple example, a first given brake assembly 200 may be used (along with other brake assemblies 200) first because it has the shortest predicted time to cool. However, during the braking operation, the predicted times to cool of the brake assemblies being used may change and the cooling time harmonising function may switch from the first to a second brake assembly 200 which now has a shorter predicted time to cool.

Harmonising the times to cool in this manner may allow waiting time (i.e. the turn-around time) required between flights to be predicted and may reduce the total waiting time.

It should be appreciated that FIG. 4b illustrates a particular example. In other examples, blocks 412 to 418 may be performed in a different order. For example, after the indication of the condition of the brake assemblies 200 is received, it may be determined whether the temperature of at least one of the brake assemblies 200 is above a dispatch temperature threshold (i.e. block 416 may be performed directly after block 410), and if so, the method may proceed to block 418 at which the cooling time harmonisation function is selected as the second control function. If the dispatch temperature threshold is not exceeded, the method may then proceed to block 412, and 414 if the thermal oxidation limiting criterion is met. In some examples, blocks 412 and 414 may be omitted. In some examples, blocks 416 to 418 may be omitted.

The brake condition indicator 306 may also comprise a brake wear indicator 310 and the brake condition may further comprise an amount of brake wear of the brake assemblies 200. Alternatively, or in addition, the brake condition indicator 306 may also comprise a brake thermal oxidation state indicator 312 and the brake condition may further comprise a thermal oxidation state of the brake assemblies 200. In the following example, the brake condition indicator 306 comprises the brake wear indicator 310 and the thermal oxidation state indicator 312. The brake wear indicator 310 may be configured similarly to any of the other indicators included in the braking system 300 as previously described. The controller 304 may receive the amount of brake wear of each brake assembly 200 from the brake wear indicator 310.

The brake wear indicator 310 may comprise a wear sensor for measuring a parameter relating to a wear state of each of the brake assemblies 200. The wear sensors may measure the length L of the brake discs 202, mass of the brake discs 202, or any other parameter from which the wear state may be derived. The wear sensors can be of any suitable design. For example, in the case where the brake assemblies 200 are hydraulically actuated, the wear sensors may comprise a linear variable differential transformer (LVDT) sensor, or a Hall Effect sensor, configured to measure the linear displacement (wear) of a component of the brake assemblies 200. Such a linear displacement sensor may be located, for example, on the rear of the brake piston housing. In the example of the brake assemblies 200 being electrically actuated brakes comprising an e-brake controller, the brake wear may be measured as part of the e-brake controller.

The brake thermal oxidation state indicator 312 may be configured similarly to any of the other indicators included in the braking system 300 as previously described. The controller 304 may receive the thermal oxidation state of each brake assembly 200 from the brake thermal oxidation state indicator 312. In some examples, the brake thermal oxidation state indicator 312 may determine the thermal oxidation state of each brake assembly 200 using the methods and systems described in an earlier unpublished application, namely GB patent application number 1803203.7, attached hereto as an Annex. For example, the thermal oxidation state of a given brake assembly 200 after a braking operation may be determined using a thermal oxidation model based on an initial thermal oxidation state of the given brake assembly 200 before the braking operation and a temperature profile of the given brake assembly 200 with respect to time. The brake thermal oxidation state indicator 312 may store the up-to-date thermal oxidation state of the given brake assembly 200 in a computer readable storage medium (e.g. a computer readable storage medium which is part of the computing system 106), and the controller 304 may retrieve the thermal oxidation state of the given brake assembly 200 from said computer readable storage medium.

The controller 304 may be configured to select the brake wear reduction function or the thermal oxidation harmonising function as the second wheel brake control function, if the temperature of at least one aircraft wheel brake is not above the dispatch temperature threshold, based on the amount of brake wear and the thermal oxidation state of the brake assemblies 200.

As indicated by block 416, if the temperature of at least one of the brake assemblies 200 is not above the dispatch temperature threshold, the method 400 may proceed to block 420. As indicated by block 420, the method 400 may proceed to either block 422 or block 424 based on the amount of brake wear and the thermal oxidation state of the brake assemblies 200. For example, if the amount of brake wear of the brake assemblies 200 is more advanced than the thermal oxidation state of the brake assemblies 200, the method 400 proceeds to block 422. To determine which of the amount of brake wear or the thermal oxidation state of a given brake assembly 200 is more advanced, the amount of brake wear may be compared to a brake wear threshold for the given brake assembly 200 and the thermal oxidation state may be compared to a thermal oxidation threshold of the given brake assembly 200.

The brake wear threshold may relate to an amount of reduction of length L of the brake discs 202 compared to the original length. In such examples, the amount of brake wear may be expressed as an amount of length reduction of the brake discs 202 which has occurred as a percentage of the original length. It may be determined what percentage of the brake wear threshold, the amount of brake wear of the given brake assembly 200 is. For example, if the brake wear threshold is 22.6% and the amount of brake wear is 11.3%, then the brake wear is 50% of the brake wear threshold. This percentage may be used as a measure of how advanced the brake wear of the given brake assembly 200 is.

The thermal oxidation threshold may relate to an amount of mass lost due to thermal oxidation (as a percentage of the original mass) from the given brake assembly 200. In such examples, the thermal oxidation state of the given brake assembly 200 may be expressed as an amount of mass loss (as a percentage of the original mass) from the given brake assembly 200 that has occurred due to thermal oxidation. It may be determined what percentage of the thermal oxidation threshold the thermal oxidation state of the given brake assembly 200 is. For example, if the thermal oxidation threshold is 5% and the thermal oxidation state of the given brake assembly 200 is 2%, then the thermal oxidation state is 40% of the thermal oxidation threshold. This percentage may be used as a measure of how advanced the thermal oxidation state of the given brake assembly 200 is.

The brake wear threshold and the thermal oxidation threshold may be set at a level at which service or replacement of the given brake assembly 200 (or a component of the given brake assembly 200) may be required. Depending on the physical properties of the brake assembly 200, the thermal oxidation threshold may be within the range 4% to 6.5% of the original brake mass lost. In some examples, the thermal oxidation threshold may be 5.7% of the original brake mass lost. Also depending on the properties of the given brake assembly 200, the brake wear threshold may be 22% to 24% of the original length. The reduction in length which triggers servicing or replacement may depend on brake type. In some examples, a reduction in the length L of the brake discs of 35 mm to 65 mm may trigger service or replacement. For exemplary disks having an original length L of around 221 mm, a reduction in length of around 50 mm may trigger servicing or replacement.

In other examples, the thermal oxidation state may be expressed as a percentage of the original mass lost due to thermal oxidation (as described previously) and the amount of brake wear may be expressed as a percentage of the original mass lost due to brake wear. In such examples, the amount of brake wear and the thermal oxidation state may be directly compared to determine which is more advanced.

In the specific described example, the amount of brake wear of the given brake assembly is more advanced (at 50% of the respective threshold). To determine which of the thermal oxidation state or the amount of brake wear of the brake assemblies 200 as a whole is more advanced, the average amount of brake wear over all the brake assemblies 200 may be compared with the average thermal oxidation state of all the brake assemblies 200 in any manner described in the preceding description. The controller 304 may select either the brake wear reduction function or the thermal oxidation harmonising function based on the overall comparison of all the brake assemblies 200.

If the amount of brake wear of the brake assemblies 200 as a whole is more advanced, the method 400 may proceed to block 422. At block 422, the controller 304 selects the brake wear reduction function as the second control function. The brake wear reduction function causes the number of times the brake assemblies 200 are applied to be controlled. In such examples, the aircraft 100 comprises a plurality of brake assemblies 200. The brake wear reduction function may define at least two brake groups, each defined brake group being a different subset of the plurality of brake assemblies 200. Each defined brake group may be located on the aircraft 100 so that each defined brake group comprises a symmetrical arrangement of brake assemblies. The symmetrical arrangement may prevent the aircraft 100 from diverting from its course when a brake group is applied.

The brake wear reduction function may apply a subset of the defined brake groups to provide braking during the braking operation. The brake wear reduction function may alternate between different subsets of the defined brake groups so as to reduce the total number of braking applications each of the brake assemblies 200 is used for.

It should be appreciated that the amount of brake wear for carbon brakes may correlate significantly with the number of brake applications. Therefore, reducing the total number of brake applications a given brake assembly 200 is used for may reduce the amount of brake wear over time as compared to cases in which all brake assemblies 200 are applied in each braking application.

In some example, if the temperature of at least one of the brake assemblies 200 is not above the dispatch temperature threshold (as determined at block 416), the method 400 may proceed directly to block 422 to select the brake wear reduction function as the second control function. In such example, block 420 and 424 may be omitted.

If, at block 420, the thermal oxidation state of the brake assemblies as a whole is more advanced, the method 400 may proceed to block 424 and the controller 304 may select the thermal oxidation harmonising function as the second control function in order to control the braking operation.

The thermal oxidation harmonising function causes the controller 304 to control the application of a given brake assembly 200 based on its respective thermal oxidation state relative to the respective thermal oxidation states of the other brake assemblies 200. For example, the given brake assembly 200 may be applied based on how advanced its oxidation state is compared to the respective oxidation states of the other brake assemblies 200. In some examples, all the brake assemblies 200 may have the same thermal oxidation threshold. In such examples, the respective oxidation states of different brake assemblies may be compared directly. In examples in which the thermal oxidation thresholds differ among the brake assemblies, how advanced the thermal oxidation state of a particular brake assembly is may be determined with respect to its thermal oxidation threshold.

The thermal oxidation harmonising function may cause the controller 304 to control each of the brake assemblies 200 such that each brake assembly 200 reaches a respective oxidation threshold at about the same time.

For example, the thermal oxidation harmonising function distributes the braking among the brake assemblies 200 based on the respective thermal oxidation states such that each brake assembly 200 reaches a respective oxidation threshold at about the same time. The brake assemblies which have a less advanced thermal oxidation state may be applied in preference over those brake assemblies which have a more advanced thermal oxidation state. For example, the oxidation state of the given brake assembly 200 may be compared to the respective oxidation states of the other brake assemblies 200. If the given brake assembly has a thermal oxidation state which is less advanced than that of the other brake assemblies, the given brake assembly 200 may be applied in preference to the other brake assemblies 200.

Such control of the application of the brake assemblies 200 may result in the brake assemblies 200 which have a less advanced thermal oxidation state being used and oxidising further (if they reach sufficiently high temperatures), while the brake assemblies which are not used (due to a more advanced thermal oxidation state) do not oxidise further. The thermal oxidation harmonising function may therefore result in all brake assemblies 200 reaching their respective thermal oxidation thresholds at about the same time same time, and requiring service or replacement of the whole or part of the brake assemblies 200 at about the same time. This may advantageously allow improved maintenance scheduling and may for example allow fewer instances of maintenance being required.

The thermal oxidation harmonising function may cause the controller 304 to control braking based on the thermal oxidation state of each of the brake assemblies 200 as indicated by the brake thermal oxidation state indicator 312. In examples where the braking system 300 does not comprise the brake thermal oxidation state indicator 312, the controller 304 may receive the thermal oxidation state of each of the brake assemblies 200 from an apparatus separate from the braking system 300 in order to control braking according to the thermal oxidation harmonising function.

In some examples, block 410 to 420 may be omitted and the controller 304 may simply control the braking operation according to the brake wear reduction function at block 408 shown in FIG. 4a. In some examples, block 410 to 422 may be omitted and the controller 304 may simply control the braking operation according to the thermal oxidation harmonising function at block 408 shown in FIG. 4a. The controller 304 may be configured to select the brake wear reduction function or the thermal oxidation harmonising function as the second control function. In some examples, blocks 412 to 418 may be omitted and the method may proceed from block 410 directly to block 420. In some examples, block 420 may be omitted and only one of blocks 422 and 424 may be included.

In some examples, the blocks shown in FIG. 4b may be performed in a different order such that block 420 is performed directly after block 410. In such examples, if the amount of brake wear is more advanced, the method may proceed to block 422 and the brake wear reduction function may be selected. In some such examples, if the thermal oxidation state of the brake assemblies 200 is more advanced, the method may proceed to block 412 followed by block 414 or block 416 depending upon whether the thermal oxidation limiting criterion is met. Alternatively, in such examples, the method may proceed from block 420 to block 416 followed by block 418 if the dispatch temperature threshold is exceeded, or block 412 if the dispatch temperature threshold is not exceeded.

Any of the described brake control functions may be implemented on their own without the described methods being performed. For example, the braking system 300 may not compare the speed of the aircraft 100 to the speed threshold and may not select brake control functions based on the condition of the brake assemblies 200. In such examples, the braking system 300 may simply use one of the described brake control functions to control the braking operation without making a selection based on any criteria. For example, the braking system 300 may control braking according to the thermal oxidation harmonising function. In some examples, the braking system 300 may control braking according the cooling time harmonising function, or any other described function.

Any given one of the described brake control functions may be implemented by a braking system comprising at least the necessary features to implement that given brake control function. For example, a braking system for an aircraft operable to apply a plurality of aircraft wheel brakes according to respective thermal oxidation states may be provided. Such a braking system may comprise a controller configured to control the application of a brake of the plurality of brakes based on its respective thermal oxidation state relative to the respective thermal oxidation states of the other brakes. Such a braking system may comprise the thermal oxidation state indicator 312, or its controller may receive the thermal oxidation states of the plurality of brakes from elsewhere. In such examples, the controller may be configured to control each of the plurality of brakes such that each brake reaches a respective thermal oxidation threshold at about the same time. In this example, the braking system implements an example of the thermal oxidation harmonising function.

In some examples, a braking system for an aircraft operable to apply a plurality of aircraft wheel brakes according to respective times to cool to a dispatch temperature threshold may be provided. Such a braking system may comprise a controller configured to control the application of a brake based on its respective predicted time to cool to the dispatch temperature threshold relative to the respective predicted times to cool to the dispatch temperature threshold relative to the respective predicted times to cool to the dispatch temperature threshold of the other brakes. In such examples, the controller may be configured to control each of the plurality of brakes such that the predicted time to cool to the dispatch temperature threshold for all of the plurality of brakes is about the same. In this example, the braking system implements an example of the brake cooling time harmonising function.

All or part of the described methods may be performed in real-time, during aircraft operation. For example, the described methods may be performed in real-time when the aircraft 100 is in a taxiing phase and/or when a braking operation is occurring. For example, the aircraft speed may be compared to the aircraft speed threshold repeatedly and the condition of the brake assemblies 200 may be compared to the relevant criteria and thresholds (e.g. the thermal oxidation limiting criterion, dispatch temperature threshold, etc.) repeatedly. For example, all or part of the described methods may be performed live such that the control function, according to which the braking operation is controlled, is switched from one to another during the braking operation. For example, during a single braking operation, the speed of the aircraft may change from being above the aircraft speed threshold to being below the aircraft speed threshold. In such examples, when the described methods are performed real-time, the controller 304 may switch from using the torque equalisation function to a second control function. It will be appreciated that the controller 304 may also switch from one of the second control functions to another in real-time during the braking operation (e.g. from the cooling time harmonisation function to the brake wear reduction function, etc.).

For example, all or part of the described methods may be performed repeatedly at a fast rate, with aircraft speed, temperature and/or other brake condition parameters being sampled multiple times per second, up to the sampling rates of respective sensors and detectors.

It should be appreciated that the method blocks of FIG. 4b demonstrate a particular example of method blocks that may be carried out as part of block 408. However, the method blocks of FIG. 4b may be carried out in any other order. Also, one or more of the method blocks of FIG. 4b may be omitted.

In some examples, the controller 304 controls the wheel braking operation according to the first wheel brake control function (i.e. the torque equalisation function) and the brake wear reduction function, when the brake wear reduction function is selected as the second wheel brake control function. For example, when the method proceeds to block 422 and the brake wear reduction is selected, the control 304 may control the braking operation according to the torque equalisation function and the brake wear reduction simultaneously (even though the speed of the aircraft is below the speed threshold previously described). For example, during a braking operation the controller 304 may select a given brake group to provide braking. The controller may then control the brake assemblies 200 within that brake group so that the torque reacted by the brake assemblies 200 that are applied is controlled according to any of the previously described examples.

As described the braking request may include information relating to a requested braking intensity. In certain scenarios, it may be desired to apply some or all the brake assemblies 200 without controlling the braking operation according to the second control function. For example, the requested braking intensity may be above a braking intensity threshold in a case where the pilot desires an immediate stop or a reduction in the speed of the aircraft 100 in a short amount of time. If the requested braking intensity is above the braking intensity threshold, the controller 304 may deactivate whichever of the second control function is being used and cause some or all the brake assemblies 200 (as required) to provide the required braking. For example, one or more of the disabled brake assemblies may be enabled in order to provide the required braking. In such an example, the controller 304 may control the braking operation according to the torque equalisation function. Alternatively, the controller 304 may not use any of the described control functions.

Figure 5:
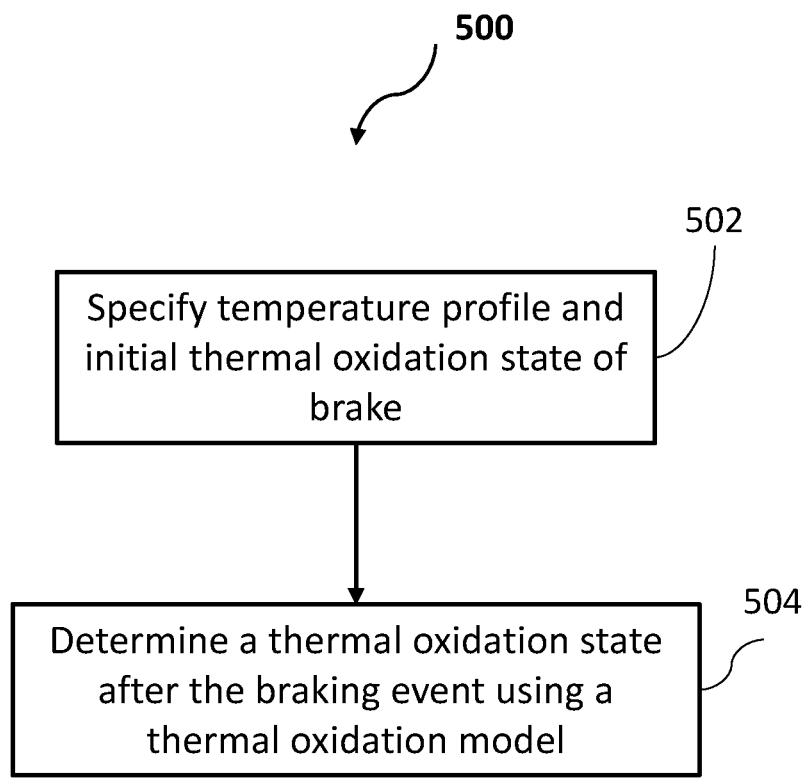
FIG. 5 is a flow diagram of an exemplary method of determining the thermal oxidation state of a brake of an aircraft landing gear.

FIG. 5 summarizes an exemplary method 500 of determining a thermal oxidation state of a brake, such as the brake assembly 200, of an aircraft landing gear assembly 102. The method 500 involves determining a thermal oxidation state of the brake assembly 200 after a braking event, using a thermal oxidation model based on an initial thermal oxidation state (which may also be referred to as the initial thermal oxidation level) before the braking event and a temperature profile of the brake with respect to time. The determined thermal oxidation state of the brake assembly 200 after the braking event may be referred to as an updated thermal oxidation state. This is because the thermal oxidation state of the brake assembly 200 after the braking event takes account of the change in the initial thermal oxidation state due to the braking event.

The braking event is an event relating to the application of the brake assembly 200. For example, a braking event may comprise one or more applications of the brake assembly 200 to slow or stop the aircraft 100. In some examples, the braking event may be a part of a time during which the brake assembly 200 is continuously being applied. Any time the brake assembly 200 is applied, the temperature of the brake assembly 200 may rise. This is because when brake assembly 200 is applied to reduce the speed of the aircraft 100, some of the kinetic energy of the aircraft 100 is absorbed into the brake assembly 200 as heat causing its temperature to rise. Therefore, whether or not the brake assembly 200 has been applied can be determined based on temperature variations of the brake assembly 200.

At block 502 of the method 500, the temperature profile and the initial thermal oxidation state of the brake assembly 200 are input. As explained above, the temperature profile indicates a variation of temperature with time. The input temperature profile may, for example, relate to a use cycle of the aircraft 100. For example, the temperature profile may be for an entire use cycle of the aircraft 100, e.g. the time from when the aircraft 100 is at a departure gate before a flight to when the aircraft 100 is at an arrival gate after a flight. Specifically, the temperature profile may indicate the variation of temperature over time for all braking events that take place during a cycle. In other examples, the temperature profile may not be for an entire use cycle of the aircraft 100. For example, the temperature profile may be over a single braking event, or a part of a cycle with many braking events. In some examples, a number of temperature profiles belonging to a particular use cycle may be used to determine the thermal oxidation state of the brake assembly 200 after that use cycle.

The temperature profile may, for example, relate to a use cycle that has occurred. In other words, the temperature profile may include actual data from the temperature sensor 216 of the aircraft 100 during a previous use cycle. In such examples, the temperature profile relates to real data. On the other hand, in some examples, the temperature profile may be a predicted temperature profile of a predicted future use cycle of the aircraft 100. In that context, a braking event may be a predicted future braking event.

The initial thermal oxidation state of brake assembly 200 is the thermal oxidation state of the brake assembly 200 before the braking event for which the updated thermal oxidation state is being determined. For example, for a new brake assembly 200 installed in aircraft 100, the initial oxidation state may indicate no oxidation. In some examples, the initial oxidation state for a newly installed brake assembly 200 may be set at installation by aircraft maintenance personnel and may either indicate no oxidation or some oxidation as assessed by the person(s) performing the installation. In examples where the brake assembly 200 is not new, the initial oxidation state may be the oxidation state calculated at a previous instance of method 500 being performed. In some examples, a brake or a brake component which is not new may be installed on aircraft 100. If the temperature profile information for all previous braking events involving that brake or brake component is available, the thermal oxidation state at installation may be determined using the available temperature profile information using method 500, or by other methods disclosed herein.

At block 504 of method 500, a thermal oxidation state after the braking event (updated thermal oxidation state) is determined using a thermal oxidation model. For example, a thermal oxidation model is applied based on the input temperature profile and the initial thermal oxidation state of the brake assembly 200. A thermal oxidation model, for example, indicates how the thermal oxidation state is expected to change with time for various temperatures starting from the initial thermal oxidation state. A thermal oxidation model is a model of the evolution of the thermal oxidation of the brake. Which thermal oxidation model is used may depend, for example, on the initial thermal oxidation state. The details and selection of appropriate thermal oxidation models is described further below. In some examples, the method 500 may be performed live during a use cycle of the aircraft 100. In the case of the method 500 being performed live (i.e. in real time or near real time), the temperature profile used may be from the temperature data acquired thus far by the temperature sensor 216, for example. At block 504, therefore, it is determined how the oxidation state, starting from the initial oxidation state, has changed as a result of the increased temperature associated with the braking event in question.

After the updated thermal oxidation state has been determined, the initial thermal oxidation state may be set to the updated thermal oxidation state. In this way, the initial thermal oxidation state is kept up to date with all previous braking events. In examples where the temperature profile relates to more than one braking event, the method 500 may be performed again in order to determine an updated thermal oxidation state after a subsequent braking event. Updating the initial thermal oxidation state in this manner may ensure that the initial thermal oxidation state being used for a subsequent braking event accounts for all the previous braking events.

In examples where the temperature profile for an entire use cycle of the aircraft 100, the method 500 may be performed to determine respective updated thermal oxidation states after each braking event within that use cycle. It will be understood that this process may be carried out sequentially in relation to the chronology of the braking events. This is so that the determination of the updated thermal oxidation state for each of the braking events is done from a starting point (an initial thermal oxidation state) which takes account of all previous braking events.

In the method 500, the updated thermal oxidation state after a braking event may, for example, be determined based on a high temperature interval, the initial thermal oxidation state and a thermal oxidation rate parameter, using an appropriate thermal oxidation model.

Figure 6:
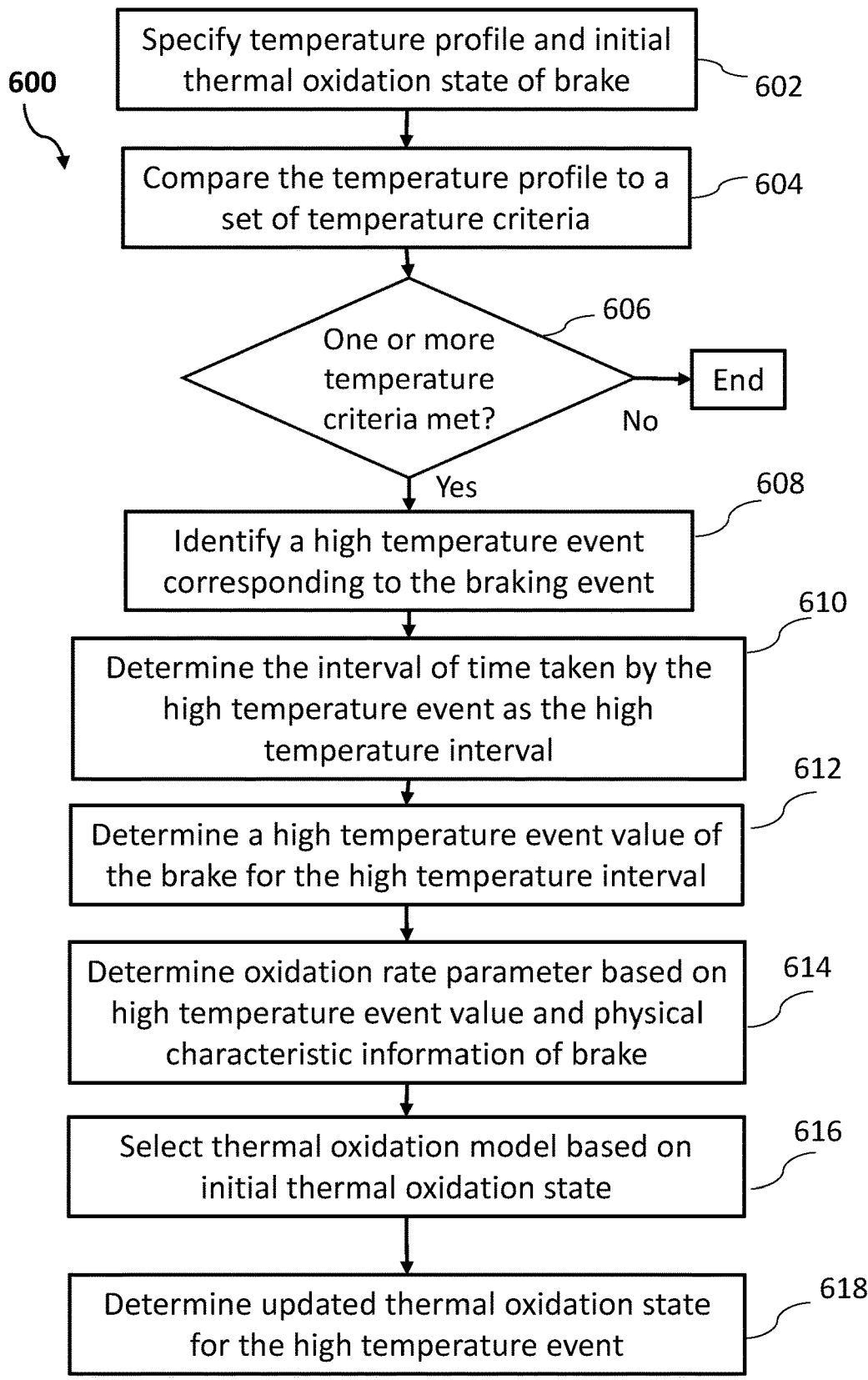
FIG. 6 is a flow diagram of an exemplary method of determining the thermal oxidation state of a brake of an aircraft landing gear.

FIG. 6 is a flow diagram of a method 600 showing acts that may be performed as part of method 500. For example, the method 600 involves more specific examples of the block 504 of the method 500. Block 602 is identical to block 502 of the method 500, in that a temperature profile of the brake with respect to time and the initial thermal oxidation state of the brake assembly 200 are input. At block 604, the temperature profile is compared to a set of temperature criteria. The set of temperature criteria may include a set of temperature thresholds. For example, the set of temperature criteria may include a first temperature threshold of 400° C. and a second temperature threshold of 750° C. In other examples, different temperature thresholds may be used depending on the physical properties of the brake assembly 200. The comparison of the temperature profile may, for example, take place sequentially in time order of the temperature data contained in the temperature profile. For example, a temperature value may be compared to the set of temperature thresholds, and subsequently, the next temperature value in time may be compared to the set of temperature thresholds.

At block 606, it is determined if one or more of the temperature criteria are met. If, for example, none of the temperature thresholds are exceeded, the method 600 ends. It will be appreciated that thermal oxidation of the CC composite of the brake discs 202 is a process that is most significant at high temperatures. A comparison of the temperature profile with the set of temperature thresholds therefore identifies high temperature events corresponding to braking events that may result in thermal oxidation. As mentioned above, a braking event is, for example, an application of the brake assembly 200. However, a high temperature event is an event during which the temperature of the brake assembly exceeds at least one of the temperature thresholds as a result of a braking event. For example, if during a braking event (i.e. a braking application) the temperature of the brake assembly 200 remains below all temperature thresholds, then no high temperature events occurred during that braking event. On the other hand, if during a braking event the temperature of the brake assembly exceeds a temperature threshold, the part of the braking event for which that temperature threshold is exceeded may be referred to as a high temperature event. If more than one temperature threshold is exceeded, a high temperature event may be the part of the braking event for which the highest temperature threshold is exceeded.

The temperature thresholds may be set based on temperatures above which a significant amount of thermal oxidation is expected to occur. Therefore, the method 600 ends if none of the temperature thresholds are exceeded. This is because, in this example, no braking events causing a sufficiently high temperature for thermal oxidation have occurred. In such examples, the updated thermal oxidation state after the braking event may simply be set to the initial thermal oxidation state before the braking event in question.

Figure 7:
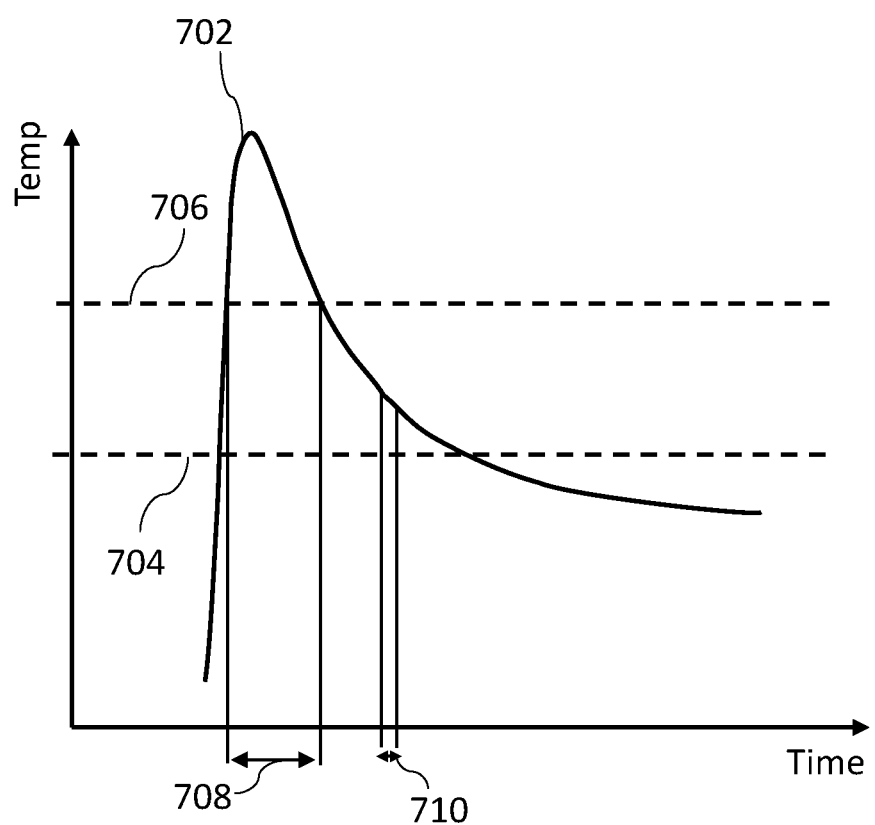
FIG. 7 is an exemplary graph illustrating the temperature of a brake with respect to time.

On the other hand, if at least one of the temperature thresholds is exceeded, at block 608 of the method 600, a high temperature event corresponding to the braking event in question is identified. A high temperature event corresponds to the part of the temperature profile which is above the highest of the exceeded temperature thresholds. This is because the part of the temperature profile which is above the highest of the exceeded thresholds corresponds to the part of the braking event for which the highest temperature threshold is exceeded. The identification of a high temperature event is described with reference to FIG. 7. FIG. 7 is a graph illustrating a part of an example temperature profile. In the graph of FIG. 7, the vertical axis represents temperature of the brake assembly 200, and the horizontal axis represents time. In this example, profile part 702 indicates that the temperature of the brake assembly 200 exceeds a first temperature threshold 704 and a second temperature threshold 706. In this example, the high temperature event is identified as the part of the profile 702 above the second temperature threshold 706 as the second temperature threshold 706 is the highest temperature threshold which is exceeded.

The amount of thermal oxidation which occurs above the second temperature threshold 706 may be significantly greater for a given interval of time compared to the thermal oxidation above the first temperature threshold 704 but below the second temperature threshold 706. Therefore, in this example, the parts of the temperature profile below the second temperature threshold 706 are not taken into account. In other examples, for example when the method 600 is used for live oxidation state monitoring as described further below, the parts of the temperature profile between the two temperature thresholds may be taken into account. It should be appreciated that the graph of FIG. 7 is merely an illustration of an example for explanatory purposes.

At block 610, the interval of time taken by the high temperature event is determined to be the high temperature interval. As mentioned above, the updated thermal oxidation state may be determined based on (among other factors) the high temperature interval. In the example of FIG. 7, the high temperature interval is determined to be the time interval 708.

At block 612, a high temperature event value of the brake assembly 200 is determined for the high temperature interval. The high temperature event value is a value of temperature ascribed to the high temperature event. In some examples, the high temperature event value is the average temperature during the high temperature interval. Alternatives to the high temperature event value being the average temperature are described below in the context of live oxidation monitoring.

At block 614, an oxidation rate parameter is calculated based on the high temperature event value and physical characteristic information of the brake. For example, the oxidation rate parameter for the thermal oxidation reaction may be determined based on the Arrhenius equation shown as Equation 1 below:

$$k(T)=Ae^{-E_A/RT} \quad (1)$$

In Equation 1, k(T) is the thermal oxidation rate, A is a pre-exponential constant, $E_A$ is the activation energy of the carbon atoms of the CC composite components of brake assembly 200, R is the universal gas constant and T is the temperature. In this example, for a particular high temperature event, the temperature T in Equation 1 is set to the high temperature event value for the purpose of block 614. In this example, the thermal oxidation rate k(T) is the oxidation parameter determined at block 614. The values of activation energy $E_A$, and the pre-exponential constant A may depend on the physical properties of the CC composite components of brake assembly 200 (in this example, the brake discs 202). For example, the values of these parameters may depend on the density, porosity, manufacturing process, contaminants present in the CC composite structures, the surface finish of the components and surface coatings of the brake assembly 200. The values of the activation energy $E_A$, and the pre-exponential constant A may also vary depending on the high temperature event value and the initial thermal oxidation state. Therefore, in order to determine the oxidation parameter, appropriate values of activation energy $E_A$, and the pre-exponential constant A may be selected based on the physical properties of the brake assembly 200, the high temperature event value and the initial thermal oxidation state before the braking event in question.

For example, the activation energy $E_A$ may be related inversely to temperature. The activation energy $E_A$ may become lower at a temperature at which oxygen molecules are able to penetrate past the surface of the brake discs 202 and oxidation of carbon deeper in the brake discs 202 can take place. The appropriate values of activation energy $E_A$, and the pre-exponential constant A may, for example, be determined experimentally for different initial thermal oxidation amounts, temperatures and physical properties of the brake being considered before the method 600 is implemented.

Figure 8:
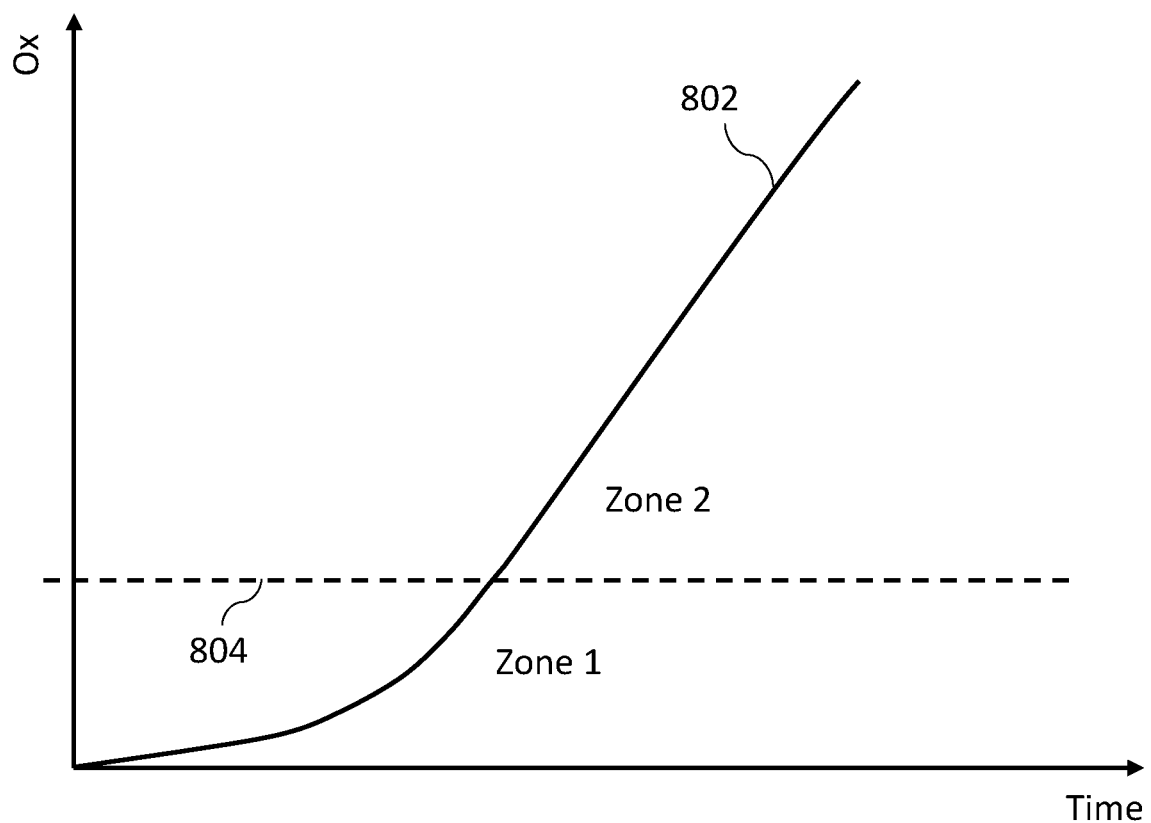
FIG. 8 is an exemplary graph illustrating the thermal oxidation state of a brake with respect to time for a specific temperature.

FIG. 8 is a graph of an example of the evolution with time of thermal oxidation of the brake discs of a brake assembly 200 for a specific temperature. The vertical axis of the graph in FIG. 8 represents a measure of the thermal oxidation indicated by the thermal oxidation state Ox. For example, the thermal oxidation state Ox may be the proportion of mass of the brake assembly 200 lost due to thermal oxidation of the brake discs 202. The evolution curve 802 shows how the proportion of mass lost due to thermal oxidation advances with time at the specific temperature. It should be noted that a different evolution curve would indicate the variation of the thermal oxidation state Ox over time for a different temperature value.

In this example, the thermal oxidation state Ox advances with time differently below a thermal oxidation state level 804, than it does above the thermal oxidation state level 804. The thermal oxidation state Ox (i.e. mass lost due to thermal oxidation) is shown to increase non-linearly with time below oxidation state level 804 and substantially linearly with time above oxidation state level 804, in this example. In this example, the thermal oxidation state increases at an accelerated rate with time until thermal oxidation state level 804 is reached. After thermal oxidation state level 804 is reached, the rate of change of thermal oxidation state Ox with time remains generally constant. The part of the graph of FIG. 8 below thermal oxidation state level 804 may be considered as a first thermal oxidation zone, namely Zone 1, and the part of the graph of FIG. 8 above thermal oxidation state level 804 may be considered as a second thermal oxidation zone, namely Zone 2, for example.

In some examples, different values of the activation energy $E_A$, and the pre-exponential constant A may be used depending on which thermal oxidation zone the brake assembly 200 is in as indicated by the initial thermal oxidation state.

At block 616, a thermal oxidation model is selected based on the initial thermal oxidation state before the braking event. The thermal oxidation model describes the evolution of the thermal oxidation state Ox of the brake assembly 200 for different values of temperature. A thermal oxidation model which describes the evolution of the thermal oxidation state Ox in Zone 1 may be selected when the initial thermal oxidation state is in Zone 1. A thermal oxidation model which describes the evolution of the thermal oxidation state Ox in Zone 2 may be selected when the initial thermal oxidation state is in Zone 2. For example, a first thermal oxidation model, Model 1, may be selected for Zone 1, and a second thermal oxidation model, Model 2, may be selected for Zone 2. Model 1 for Zone 1, describing the non-linear change of thermal oxidation state Ox with time, may be represented by Equation 2. Model 2 for Zone 2, describing the linear change of thermal oxidation state Ox with time, may be represented by Equation 3 below.

$$Ox=1-[1-\{k(T) \times t_{eq}(1-n)\}^{1/1-n}] \quad (2)$$

$$Ox=k(T) \times t_{eq} \quad (3)$$

In Equation 2 and Equation 3 above, k(T) is the thermal oxidation rate as defined by Equation 1. The parameter $t_{eq}$ is the equivalent time, which is the time it would take, at temperature T, to reach the thermal oxidation state Ox. The parameter n is referred to as the equation order and depends on the properties of the CC composite used in the brake assembly 200. The parameter n may, for example be experimentally determined for a brake using a particular CC composite.

In some examples, different thermal oxidation models to those described by Equations 2 and 3 may be used. In some examples, a single thermal oxidation model may be used which describes the evolution of the thermal oxidation state Ox for all thermal oxidation states Ox that are relevant to the brake assembly 200. In some examples, more than two thermal oxidation models may be used for respective ranges of thermal oxidation states Ox. The method 600 may be modified appropriately in order to use such alternative thermal oxidation models. For example, a different set of inputs may be applied to the thermal oxidation model, as appropriate, than are described in this specific example of the method 600.

It will be understood that block 616 may be performed at any stage of the method 600 once block 602 has been performed, because block 616 requires the initial thermal oxidation state.

At block 618, the updated thermal oxidation state for the high temperature event is determined using the selected thermal oxidation model based on the high temperature interval, the initial thermal oxidation state and the determined thermal oxidation rate parameter. For example, the time it would take to reach the initial thermal oxidation state from zero at the high temperature value is determined and the high temperature interval is added to this time in order to determine the value of $t_{eq}$ to be used in the selected thermal oxidation model. Inputting the thus determined value of $t_{eq}$, as well as the thermal oxidation parameter into the equation selected from Equations 2 and 3 above results in, as an output, the updated thermal oxidation state of the brake assembly 200 after the high temperature event.

The updated thermal oxidation state may be set to the new initial thermal oxidation state for a subsequent use of the method 600 for a subsequent high temperature event in the temperature profile.

In some examples, the method 500 and/or 600 may be performed live during a use cycle when braking events are taking place. In such examples, part of the method 600, for example, may be modified to allow live brake oxidation monitoring, and the temperature profile may correspond to temperature values being measured live. For example, temperature information which the temperature sensor 216 provides may continuously be compared to the set of temperature criteria as per block 604 of method 600, and high temperature events may be identified substantially as they occur. It will be understood that even though this kind of oxidation state monitoring is described as live, the extent to which it occurs in real time will depend on various hardware and software (e.g. processing speed) limitations. For example, there may be a time delay between temperature values corresponding to a high temperature event being measured by the temperature sensor 216, and those values resulting ultimately in updated thermal oxidation states of the brake assembly 200.

For example, high temperature events may be identified as smaller parts of the temperature profile than in the example described above. Referring again to FIG. 7, the part of the profile part 702 occurring within the time interval indicated as 710 may be taken to be a high temperature event and the interval 710 as its high temperature interval. In this example, the high temperature event value may be taken to be the temperature measured at the beginning or the end of the high temperature interval 710, for example, or the average of the two temperature values. Unlike the above example, in the case of live monitoring, parts of the temperature profile between the first and second temperature thresholds may be taken into account even when the temperature exceeds the second temperature threshold 706. In the case of live monitoring, any part of the temperature profile above at least one temperature threshold, such as the part identified by interval 710, may be identified as a high temperature event. It will be understood that such modifications may allow the thermal oxidation state of the brake assembly 200 to be updated as high temperature events corresponding to braking events are taking place. In some examples, high temperature events may be identified based on the time between subsequent temperature measurements taken by the temperature sensor 216. For example, the interval 710 may be the interval of time between subsequent temperature measurements taken by the temperature sensor 216.

The methods 500 and 600 may be used in order to determine the thermal oxidation state of the brake assembly 200 after an actual use cycle of the aircraft 100 or in a live manner during an actual use cycle. In such examples, this may be done based on one or more temperature profiles encompassing braking events within that use cycle. As mentioned above, in some examples, the thermal oxidation state of the brake assembly 200 is determined in respect of a use cycle which has actually occurred using temperature profile information collected by the temperature sensor 216.

On the other hand, in some examples, the method 500 or 600 may be used to predict a future thermal oxidation state of the brake assembly 200 after a first plurality of predicted future use cycles of the aircraft 100. The first plurality of future use cycles may be a number of cycles after which a thermal oxidation threshold is reached. Each predicted future use cycle may include a respective plurality of braking events. For each predicted future use cycle, the predictions may be based on a respective predicted temperature profile of the brake assembly 200 and a current thermal oxidation state. The current thermal oxidation state is, for example, the oxidation state taking into account all the previous braking events experienced by the brake assembly 200.

For example, the predicted temperature profiles may be input into the method 500 or 600, for example in time order, to determine the future thermal oxidation state of brake assembly 200. The predicted temperature profile of a predicted future use cycle may be predicted based on previous temperature profiles for previous actual use cycles of the aircraft 100. For example, using the parts of previous temperature profiles relating to the landing phase, landing phase parts of the temperature profile for a future use cycle may be predicted. For the purpose of predicting a future thermal oxidation state, high temperature intervals, high temperature event values, etc. may be stored in a computer readable storage medium when the method 500 or 600 is being carried out for actual use cycles of aircraft 100.

In some examples, data from previous cycles may not be available, for example, because brake the assembly 200 may be new. In some examples, enough data may not be available to reliably predict temperature profiles for predicted future use cycles. In such examples, predetermined temperature profiles may be used. The predetermined temperature profiles may be profiles typically expected for the future use cycle of aircraft 100.

The predicted temperature profiles may, for example, take into account the future flight schedule of the aircraft 100. For example, the aircraft 100 may be expected to land at an airport with a short runway requiring high energy (i.e. high temperature) braking upon landing for some of its predicted future use cycles. For those predicted future use cycles, the predicted temperature profiles may indicate high energy braking upon landing. It will be appreciated that various other factors may be taken into account when predicting temperature profiles such as taxiing time at various phases of a predicted future use cycle, waiting time between a taxiing phase and the preceding landing phase, and the like.

As mentioned above, the first plurality of predicted future use cycles may be a number of predicted future cycles after which the predicted future thermal oxidation state reaches a thermal oxidation threshold. For example, the prediction of the future thermal oxidation state may stop after a cycle in which the thermal oxidation threshold is reached. In some examples, the prediction of the future thermal oxidation state may stop as soon as the thermal oxidation threshold is reached. The thermal oxidation threshold may be an oxidation state at which servicing or replacement of the brake assembly 200 or a component of the brake assembly 200 is required. For example, the brake assembly 200 may require a service if its mass is reduced by between 4% and 6.5%, for instance 5.7%, where the selected percentage threshold may vary depending, for instance, on the original, manufactured disc density. In this example, the first plurality of predicted future use cycles is the number of cycles it takes for the proportion of mass lost due to thermal oxidation to reach or exceed, for instance, 5.7% (i.e. being within the range 4% to 6.5%).

On the other hand, in some examples, the prediction of the future thermal oxidation state may stop at the end of a predicted future use cycle during which the future thermal oxidation state approaches close to the thermal oxidation threshold such that the future thermal oxidation state can be expected to reach the thermal oxidation threshold during the next predicted future use cycle. In such examples, the thermal oxidation threshold may be considered reached within the first plurality of predicted future use cycles. This is because, in reality, an aircraft 100 with a brake assembly 200 expected to reach the thermal oxidation threshold in a strict sense in the very next cycle would not be permitted to fly and a service or replacement relating to the brake assembly 200 may take place at that point.

Using the first plurality of predicted future use cycles, an indication may be given as to how many use cycles can take place before the brake assembly 200 or a component of the brake assembly 200 requires servicing or replacement due to thermal oxidation. In the examples where the thermal oxidation threshold is strictly reached or exceeded during the last of the first plurality of future cycles, the number of cycles before a service or replacement is required due to thermal oxidation may be predicted as one fewer than the number of cycles in the first plurality. In examples where the prediction of the future thermal oxidation state stops when the thermal oxidation threshold is expected to be reached in the next cycle after the first plurality, the first plurality is taken as the number of cycles before a service or replacement due to thermal oxidation is required.

Figure 9:
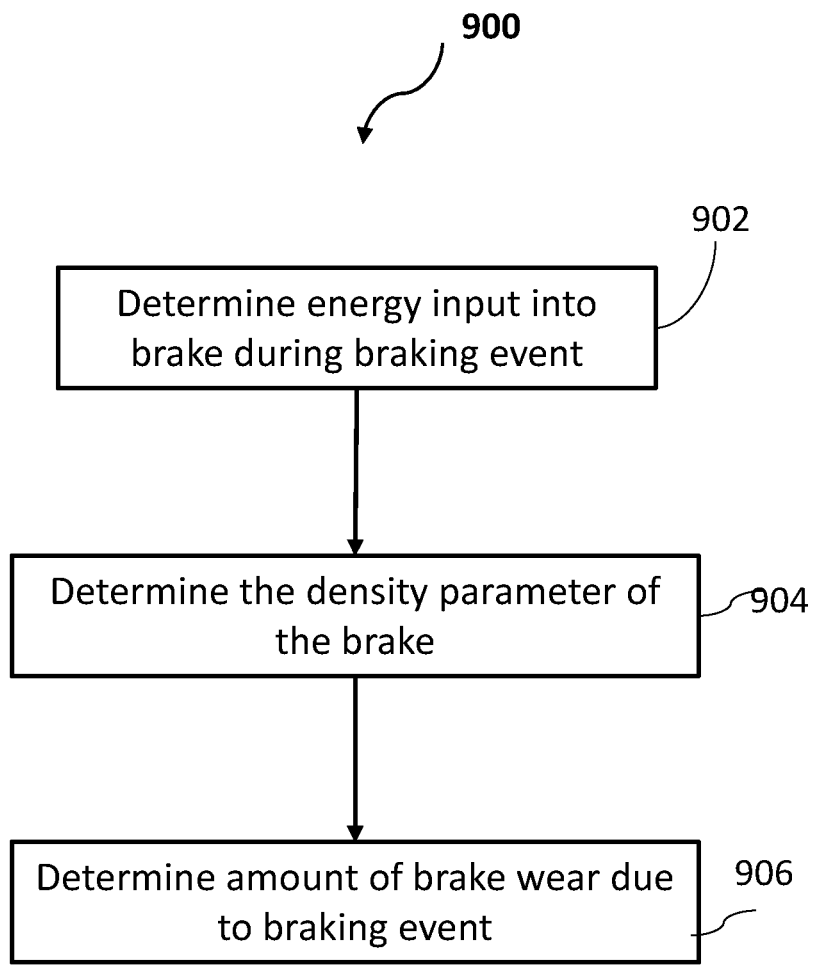
FIG. 9 is an exemplary flow diagram of a method of determining an amount of brake wear according to an example.

FIG. 9 is a flow diagram of a method 900 of determining an amount of brake wear caused by a braking event, using a brake wear model based on an amount of energy absorbed by the brake assembly 200 due to the braking event and a density parameter of the brake assembly 200. The amount of brake wear may be determined for all braking events where energy is input into the brake assembly 200 in a process involving friction that would cause a surface of the brake discs to wear. For example, wear of the brake discs due to friction may cause the length of the brake discs 202 (length L as shown in FIG. 2) to decrease as brake disk material is lost by the action of friction.

For example, the amount of brake wear may be determined for those braking events which do not involve any high temperature events. For the method 900, a braking event may, for example, be identified based on the temperature profile as an event where the temperature of the brake assembly 200 increases. In some examples, a braking event may simply be identified based on an indication that brake assembly 200 has been applied. For example, the computing system 106 of the aircraft 100 may detect when brake assembly 200 is applied and released.

At block 902 of the method 900, the energy input into the brake assembly 200 during the braking event is determined. The energy input into the brake assembly 200 may, for example, be determined based on the characteristics of the aircraft 100 during the braking event, such as a mass of the aircraft 100, the velocity of the aircraft 100 during the braking event, etc. The energy absorbed by the brake assembly 200 can be calculated based on such characteristics of the aircraft 100 by determining the kinetic energy of the aircraft 100. For example, a given proportion of the kinetic energy of the aircraft 100 may be absorbed by the brake assembly 200 to reduce the kinetic energy of the aircraft 100. In some examples, the energy input into the brake assembly 200 may be determined based on measurements acquired by the instruments 108 of the aircraft 100. For example, the instruments 108 may include a tachometer associated with the wheel 104 to which the brake assembly 200 is associated. In such examples, the tachometer measures the rotational speed of the wheel 104, and the energy absorbed by the brake assembly 200 can be determined using the change of the rotational speed with respect to time.

In other examples, if the mass of the brake assembly 200 is known, the energy absorbed may be determined based on the increase in temperature of the brake assembly 200 taking into account the specific heat of the brake assembly 200. In some examples, the mass of the brake assembly 200 may be determined based on the thermal oxidation state of the brake assembly 200 determined according to the above described methods, because, as described above, the thermal oxidation state may be expressed as an amount of mass lost from brake assembly 200 due to thermal oxidation.

At block 904 of the method 900, a density parameter of the brake assembly 200 is determined. The density parameter, for example, is a parameter indicating the decrease in density of the brake assembly 200 compared with the original density, taking into account lost mass. The density of the brake assembly 200 may decrease, for example, due to thermal oxidation. It will be understood that thermal oxidation causes a reduction in mass because carbon atoms react with oxygen to form carbon dioxide or carbon monoxide and are thus removed from brake discs 202. However, thermal oxidation may not necessarily change the volume of the brake discs 202. This is because thermal oxidation may not act uniformly on a particular surface of a brake disc and may take place up to a certain depth inside the brake disc.

The density parameter may be expressed as $(1-Ox)$ where the thermal oxidation state $Ox$ is expressed as a number between zero and one. For example, the density of the brake assembly 200 is reduced by a factor $(1-Ox)$ compared to the initial density before any thermal oxidation took place (i.e. when the brake assembly 200 was new). Therefore, the density parameter may be determined based on the initial oxidation state before the braking event.

In some examples, the reduced density of the brake assembly 200 may be determined based on measurements by instruments included in the instruments 108. For example, the mass of the brake assembly 200 may be calculated based on an amount of energy absorbed by the brake assembly 200 (based on measurements from a tachometer, for example) and the consequent increase in its temperature (based on measurements from temperature sensor 216, for example). The reduced density of the brake assembly 200 may be determined based on the calculated mass of the brake assembly 200. The aircraft 100 may include a wear pin associated with brake assembly 200. Typically, a wear pin provides an indication of the reduction in length L of a brake and therefore an indication of the brake wear. The wear pin may be checked between cycles by ground crew, for example, and an updated volume value of the brake assembly 200 acquired. In some examples, there may be other ways to measure the change in length L of the brake assembly 200. For example, a length sensor may be provided for the brake assembly 200, and/or electrically actuated brakes may be used. An updated volume value may be determined, based on reduced length L, and used to determine the reduced density from the mass. During a single cycle, the change in volume of brake assembly 200 may be insignificant for the purpose of calculating the density parameter, and an updated volume may be acquired after a number of cycles. From the reduced density, the density parameter may be determined.

At block 906 of the method 900, an amount of brake wear caused by the braking event is determined, using a brake wear model based on the energy absorbed by the brake assembly 200 and the density parameter from block 904. For example, the mass of the brake assembly 200 lost due to wear during the wear event is determined using the brake wear model of Equation 4 below.

$$m_{wear} = \frac{W + X \times E_{brake} + Y \times E_{brake}^2 + Z \times E_{brake}^3}{(1 - Ox)} \quad (4)$$

In Equation 4 above, $m_{wear}$ is the mass lost due to wear during the braking event, $E_{brake}$ is the energy absorbed by the brake assembly 200, and W, X, Y and Z are constants. The constants W, X, Y and Z may, for example, be determined by experiment beforehand, and may vary depending on the properties of the brake assembly 200. The brake wear amount for a braking event may be determined as a reduction in length L of the brake assembly 200 based on the reduction of mass due to brake wear during that braking event.

As mentioned above, the initial thermal oxidation rate is used to determine the density parameter in some examples. In these examples, when a braking event takes place during which a high temperature event also occurs, the initial thermal oxidation state may be used for the determination of block 906. This is because brake wear occurs on a much shorter timescale than thermal oxidation.

The amount of brake wear determined for a braking event may be added to the amount of brake wear from all previous braking events of the brake assembly 200 in order to determine the total brake wear amount.

The method 900 may, for example, be performed live during a time when braking events are taking place, or for a use cycle which has already occurred using the relevant data from that use cycle. The method 900 may also be used in order to predict a future brake wear amount for the brake assembly 200 after a second plurality of predicted future use cycles of the aircraft 100. The second plurality of predicted future use cycles may be a number of cycles after which a brake wear threshold is reached. Each predicted future use cycle may include a respective plurality of braking events. For example, the method 900 may be performed for each braking event in the second plurality of predicted future use cycles. The wear amount from each of those braking events may be added up to predict the future brake wear amount for the second plurality of predicted future use cycles. For each predicted future use cycle, the predictions may be based on predicted amounts of energy absorbed by the brake during respective braking events, and respective predicted density parameters of the brake for respective braking events. For example, braking events may be identified and energy absorbed by brake assembly 200 for those braking events determined based on the predicted temperature profiles. In other examples, predicted amounts of absorbed energy may be based on data from previous cycles. If the brake assembly 200 is new, or enough previous data is not available, the predicted amounts of energy may be predetermined.

For the purpose of predicting the future brake wear amount, the method 900 may be used in combination with the method 500 or 600. In these examples, the up to date initial thermal oxidation state just before each predicted braking event (e.g. a predicted future braking event) is known. In this way, the mass of the brake assembly 200, and therefore the density parameter, may be determined using the initial thermal oxidation before the future braking event in question.

As mentioned above, the second plurality of predicted future use cycles may be a number of predicted future cycles after which the predicted future brake wear amount reaches a brake wear threshold. For example, the prediction of the future brake wear amount may stop after a cycle in which the brake wear threshold is reached. In some examples, the prediction of the future brake wear amount may stop as soon as the total brake wear amount reaches the brake wear threshold. The brake wear threshold may be a total amount of brake wear at which servicing or replacement of the brake assembly 200 or a component of the brake assembly 200 is required. For example, a brake assembly such as the brake assembly 200 of FIG. 2 may require a service if its length L has been reduced by, say, 22% to 24%, depending, for example, on the kind of discs and original, manufactured density thereof. For an exemplary disk having an original length L of around 221 mm, a reduction in length of around 50 mm may trigger servicing or replacement. In this example, the second plurality of predicted future use cycles is the number of cycles it takes for the total brake wear amount to reach or exceed, for instance 50 mm (again, for an original disc having a length L of around 221 mm).

On the other hand, in some examples, the prediction of the future brake wear amount may stop at the end of a predicted future use cycle during which the total brake wear amount approaches close to the brake wear threshold such that the total brake wear amount can be expected to reach the brake wear threshold during the next predicted future use cycle. In such examples, the brake wear threshold may be considered reached within the second plurality of predicted future use cycles. This is because, in reality, an aircraft 100 with the brake assembly 200 expected to reach the brake wear threshold in a strict sense in the very next cycle would not be permitted to fly and a service or replacement relating to the brake assembly 200 may take place at that point.

Using the second plurality of predicted future use cycles, an indication may be given as to how many use cycles can take place before the brake assembly 200 or a component of the brake assembly 200 requires servicing or replacement due to brake wear. In the examples where the brake wear threshold is strictly reached or exceeded during the last of the second plurality of future cycles, the number of cycles before a service or replacement is required due to brake wear may be predicted as one less than the number of cycles in the second plurality. In examples where the prediction of the future brake wear amount stops when the brake wear threshold is expected to be reached in the next cycle after the second plurality, the second plurality is taken as the number of cycles before a service or replacement due to brake wear is required.

Figure 10:
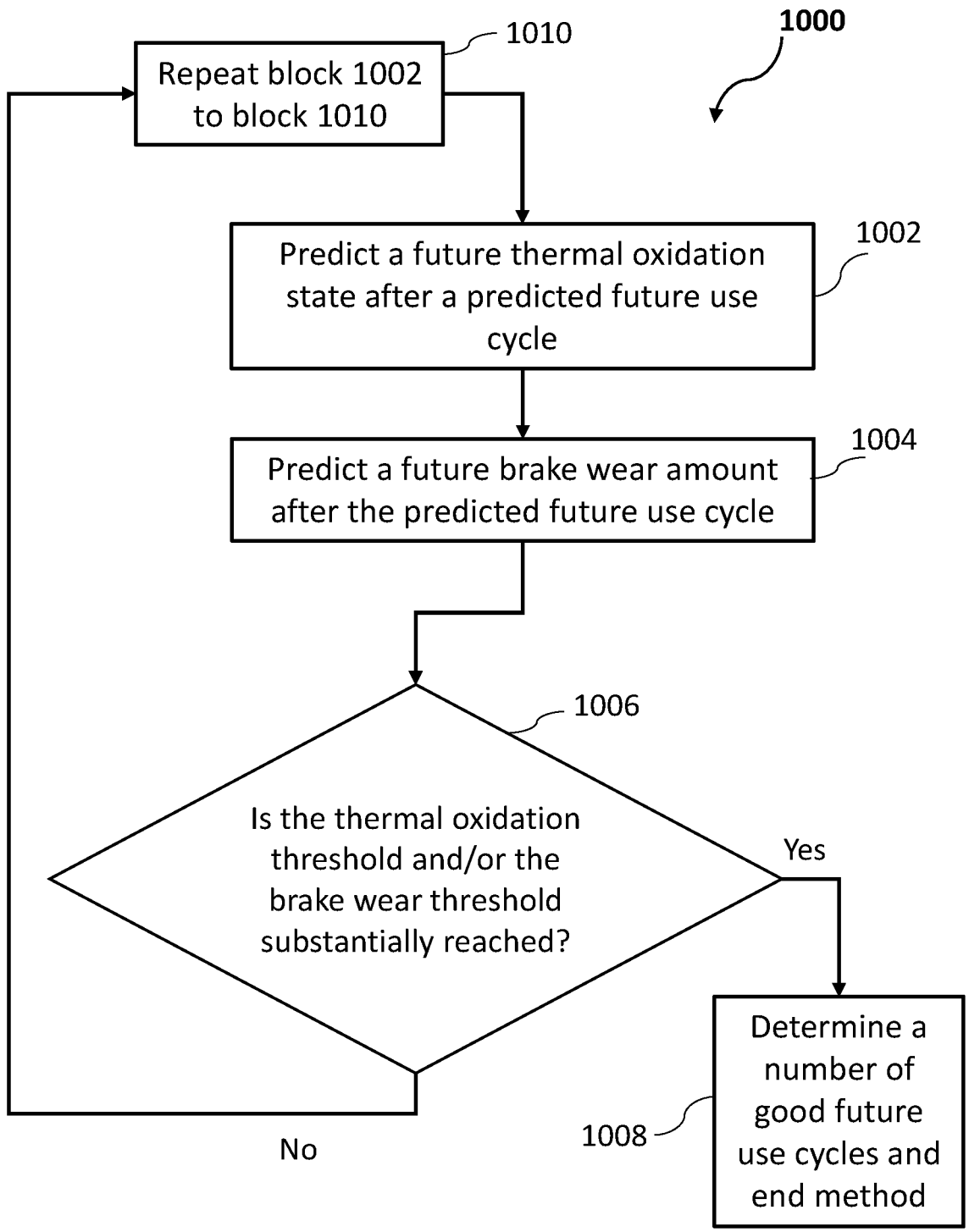
FIG. 10 is an exemplary flow diagram of a method of predicting a number of good future use cycles with respect to an aircraft brake according to an example.

FIG. 10 is a flow diagram of a method 1000 for determining a number of good future use cycles until one of the thermal oxidation threshold and the brake wear threshold is reached. The number of good future use cycles is the remaining number of future use cycles before one of the thermal oxidation threshold or the brake wear threshold is reached. The method 1000 may be performed for a number of predicted future use cycles until the first of the thresholds is reached. The method 1000 involves predicting a future thermal oxidation state and a future brake wear amount after a predicted future use cycle and, if one of the thermal oxidation threshold and the brake wear threshold is reached, determining a number of good future use cycles before either of the thresholds is reached. If one of the thresholds is not reached, the predictions are performed for the next predicted future use cycle. As in the above examples, each predicted future use cycle includes a plurality of braking event. For each predicted future use cycle the predictions are based on a respective predicted temperature profile of the brake, a current thermal oxidation state, predicted amounts of energy absorbed by the brake during respective braking events, and respective predicted density parameters of the brake for respective braking events.

The number of good future use cycles is a number of cycles after which servicing or replacement of the brake assembly 200 or a component of the brake assembly 200 is required. It will be appreciated that service or replacement in relation to the brake assembly 200 may be carried out when one of the thermal oxidation threshold or the brake wear threshold is first reached. Which threshold is reached first may, for example, depend on the way the aircraft 100 is handled during use and its flight schedule. For example, if the aircraft 100's schedule involves flying to mostly airports with long runways, short taxiing routes, etc., the brake wear threshold may be reached first. This is because, in such examples, the temperature of the brake assembly 200 may not often exceed any of the temperature thresholds relating to thermal oxidation. On the other hand, the aircraft 100 may often experience high energy braking (e.g. due to short runways) causing temperatures above the thresholds related to thermal oxidation. In such examples the thermal oxidation threshold may be reached first.

At block 1002 of the method 1000, a future thermal oxidation state after a predicted future use cycle is predicted. The prediction of the future thermal oxidation state is performed as described above, for example, using an appropriate thermal oxidation model based on a predicted temperature profile of the predicted future use cycle in question. At block 1004 of the method 1000, a future brake wear amount after the same predicted future use cycle is predicted. The prediction is performed as described above in the context of method 900.

At block 1006 of the method 1000, it is determined whether the thermal oxidation threshold and/or the brake wear threshold is reached. For example, if the thermal oxidation threshold is reached, the method 1000 proceeds to block 1008 at which a number of good future use cycles, before either of the thermal oxidation threshold or the brake wear threshold is reached, is determined, and the method 1000 ends. For example, if the thermal oxidation threshold is strictly reached or exceeded after a given number of predicted future use cycles, the number of good future use cycles is one less than that given number. For example, if the thermal oxidation threshold is expected to be reached in the very next predicted future use cycle, the number of good future use cycles is determined as the number of predicted future use cycles for which the method 1000 has been performed thus far.

On the other hand, if it is determined that the brake wear threshold is reached, the method proceeds to block 1008 where a number of good future use cycles is determined, and the method 1000 ends. For example, if the brake wear threshold is strictly reached or exceeded after a given number of predicted future use cycles, the number of good future use cycles is one less than that given number. For example, if the brake wear threshold is expected to be reached in the very next predicted future use cycle, the number of good future use cycles is determined as the number of predicted future use cycles for which method 1000 has been performed thus far.

If, for example, both the thresholds are reached, the method 1000 proceeds to block 1008 where a number of remaining good future use cycles, before either the thermal oxidation threshold or the brake wear threshold is reached, is determined and the method 1000 ends. In this example, if at least one of the thresholds is strictly reached or exceeded after a given number of predicted future use cycles, the number of good future use cycles is one less than that given number. Otherwise, the number of good future use cycles is determined as the number of predicted future use cycles for which the method 1000 has been performed thus far.

If the brake wear threshold is not reached, the method 1000 proceeds to block 1010 and blocks 1002 to 1010 are repeated for the next predicted future use cycle.

In this way, a number of good future use cycles may be predicted based on which of the thermal oxidation threshold and the brake wear threshold is reached first. This is because, the brake assembly 200 may require a service or replacement, or a component of the brake assembly 200 may require a service or replacement once the first of these thresholds is reached. It will be appreciated, for example, that brake assembly 200 will not continue to be used if the thermal oxidation threshold is reached but the brake wear threshold is not. It should also be appreciated that blocks of the method 1000 may be performed in any suitable order. For example block 1004 may be performed before block 1002 and/or block 1010 may be performed before block 1006.

One or more of the above described methods, namely the methods 500, 600, 900 and 1000, or any of their variations (e.g. live determination of oxidation or brake wear, or prediction of future thermal oxidation state or future brake wear, etc.) may be performed by a processor of the computing system 106 of the aircraft 100, for example, based on instructions stored in a computer readable storage medium of the computing system 106. For example, monitoring of the thermal oxidation state (subsequent to use cycles or live) may be performed by a processor of computing system 106. Alternatively, or in addition, monitoring of the brake wear (subsequent to use cycles or live) may be performed by a processor of the computing system. Alternatively, or in addition to any of these examples, predictions relating to the future thermal oxidation state and/or the future brake wear state may be performed by a processor of the computing system 106. The methods may be performed, for example, using data from the instruments 108. For example, temperature data as measured by the temperature sensor 216 may be used. In the case of prediction, the future temperature profiles and/or other predicted data may be predicted by a processor of the computing system 106. Alternatively, the data for prediction may be determined on a computing system not on board the aircraft 100, and may be stored in a computer readable storage medium of the computing system 106.

All or part of the instructions for performing the above described processes may be generated and/or the processes may be performed using any suitable software or combination of software. In one example, "MATLAB" and/or "SCADE" may be used to generate all or part of the instructions for respective processors to carry out any of the above processes. In other examples, other software packages may be used. For example, any suitable programming language, development environment, software package, or the like may be used. Other examples of programming languages include PYTHON, C++, C, JAVASCRIPT, FORTRAN etc.

It is to noted that the term "or" as used herein is to be interpreted to mean "and/or", unless expressly stated otherwise. Although the invention has been described above with reference to one or more preferred examples, it will be appreciated that various changes or modifications may be made without departing from the scope of the invention as defined in the appended claims.

The invention claimed is:

1. A braking system for an aircraft operable to apply aircraft wheel brakes according to at least one of a plurality of wheel brake control functions, the braking system comprising:
    an aircraft speed indicator; and
    a controller configured to:
        control a wheel braking operation of the aircraft according to at least a first wheel brake control function if the aircraft speed indicated by the aircraft speed indicator exceeds a speed threshold, wherein the first wheel brake control function is a torque equalisation function which causes the wheel braking operation to be controlled such that the distribution of the torque reacted by the aircraft wheel brakes that are applied is symmetric across the aircraft and/or across a part of the aircraft with respect to a direction of travel of the aircraft;
        control the wheel braking operation of the aircraft according to at least a second wheel brake control function if the aircraft speed does not exceed the speed threshold;
        select as the second wheel brake control function:
            a wheel brake cooling time harmonising function which causes the amount of braking provided by each of the aircraft wheel brakes to be controlled such that a predicted time to cool to a dispatch temperature threshold for all of the aircraft wheel brakes is about the same,
            a wheel brake thermal oxidation limiting function which causes at least one of the aircraft wheel brakes to be disabled or enabled based on a thermal oxidation limiting criterion,
            a wheel brake wear reduction function which:
                defines at least two brake groups, each defined brake group of the at least two brake groups being a different subset of the aircraft wheel brakes;
                applies a subset of the defined at least two brake groups to provide braking during the braking operation; and
                alternates between different subsets of the defined at least two brake groups so as to reduce the total number of braking applications each of the aircraft wheel brakes is used for, or
            a wheel brake thermal oxidation harmonising function which distributes the amount of braking provided by each aircraft wheel brake among the aircraft wheel brakes based on a respective thermal oxidation state of each of the aircraft wheel brakes such that each aircraft wheel brake reaches a respective oxidation threshold at about the same time; and
        apply the aircraft wheel brakes according to the aircraft speed and the respective selected wheel brake control function.

2. The braking system according to claim 1, further comprising a brake condition indicator, wherein the controller is configured to select the second wheel brake control function according to a condition of the one or more aircraft wheel brakes.

3. The braking system according to claim 2, wherein:
    the brake condition indicator comprises a brake temperature characteristic indicator; and
    the brake condition comprises a temperature characteristic of the one or more aircraft wheel brakes.

4. The braking system according to claim 3, wherein:
    the controller is configured to select the second wheel brake control function based on the temperature characteristic of the one or more aircraft wheel brakes.

5. The braking system according to claim 4, wherein:
    the temperature characteristic comprises a temperature of the one or more aircraft wheel brakes; and
    the controller is configured to select the wheel brake cooling time harmonising function as the second wheel brake control function if the temperature of at least one aircraft wheel brake is above a dispatch temperature threshold.

6. The braking system according to claim 5, wherein:
    the controller is configured to select the wheel brake wear reduction function as the second wheel brake control function if the temperature of at least one aircraft wheel brake is not above the dispatch temperature threshold.

7. The braking system according to claim 6, wherein:
    the brake condition indicator further comprises a brake wear indicator and a brake thermal oxidation state indicator; and
    the brake condition further comprises an amount of brake wear of the one or more aircraft wheel brakes, and a thermal oxidation state of the one or more aircraft wheel brakes.

8. The braking system according to claim 7, wherein:
    the controller is configured to select the wheel brake wear reduction function or the wheel brake thermal oxidation harmonising function as the second wheel brake control function, if the temperature of at least one aircraft wheel brake is below the dispatch temperature threshold, based on the amount of brake wear and the thermal oxidation state of the one or more aircraft wheel brake.

9. The braking system according to claim 4, wherein:
    the controller is configured to select the wheel brake thermal oxidation limiting function as the second wheel brake control function if the temperature characteristic of at least one aircraft wheel brake meets a thermal oxidation limiting criterion.

10. The braking system according to claim 6, wherein the controller is configured to control the wheel braking operation according to the first wheel brake control function and the wheel brake wear reduction function, when the wheel brake wear reduction function is selected as the second wheel brake control function.

11. An aircraft comprising one or more aircraft wheel brakes; and a braking system arranged to apply the one or more aircraft wheel brakes according to claim 1.

12. A method of applying aircraft wheel brakes according to at least one of a plurality of wheel brake control functions, the method comprising:
    receiving an indication of an aircraft speed from an aircraft speed indicator;
    controlling a wheel braking operation of the aircraft according to at least a first wheel brake control function if the aircraft speed indicated by the aircraft speed indicator exceeds a speed threshold, wherein the first wheel brake control function is a torque equalisation function which causes the wheel braking operation to be controlled such that the distribution of the torque reacted by the aircraft wheel brakes that are applied is symmetric across the aircraft and/or across a part of the aircraft with respect to a direction of travel of the aircraft; and controlling the wheel braking operation of the aircraft according to at least a second wheel brake control function if the aircraft speed does not exceed the speed threshold; and selecting as the second wheel brake control function:
- a wheel brake cooling time harmonising function which causes the amount of braking provided by each of the aircraft wheel brakes to be controlled such that a predicted time to cool to a dispatch temperature threshold for all of the aircraft wheel brakes is about the same,
- a wheel brake thermal oxidation limiting function which causes at least one of the aircraft wheel brakes to be disabled or enabled based on a thermal oxidation limiting criterion,
- a wheel brake wear reduction function which:
  - defines at least two brake groups, each defined brake group of the at least two brake groups being a different subset of the aircraft wheel brakes;
  - applies a subset of the defined at least two brake groups to provide braking during the braking operation;
  - alternates between different subsets of the defined at least two brake groups so as to reduce the total number of braking applications each of the aircraft wheel brakes is used for, or
- a wheel brake thermal oxidation harmonising function which distributes the amount of braking provided by each aircraft wheel brake among the aircraft wheel brakes based on a respective thermal oxidation state of each of the aircraft wheel brakes such that each aircraft wheel brake reaches a respective oxidation threshold at about the same time; and applying the aircraft wheel brakes according to the aircraft speed and the respective selected wheel brake control function.

13. The method according to claim 12 comprising:
receiving an indication of a condition of the one or more aircraft wheel brakes from a brake condition indicator; and
selecting the second wheel brake control function according to the condition of the one or more aircraft wheel brakes.

14. The method according to claim 13, wherein:
the brake condition indicator comprises a brake temperature characteristic indicator; and
the brake condition comprises a temperature characteristic of the one or more aircraft wheel brakes.

15. The method according to claim 14 comprising:
selecting the second wheel brake control function based on the temperature characteristic of the one or more aircraft wheel brakes.

16. The method according to claim 15, wherein:
the temperature characteristic comprises a temperature of the one or more aircraft wheel brakes;
the method comprises selecting the wheel brake cooling time harmonising function as the second wheel brake control function if the temperature of at least one aircraft wheel brakes is above a dispatch temperature threshold.

17. The method according to claim 16, wherein:
the method comprises selecting the wheel brake wear reduction function as the second wheel brake control function if the temperature of at least one aircraft wheel brake is not above the dispatch temperature threshold.

18. The method according to claim 17, wherein:
the brake condition indicator further comprises a brake wear indicator and a brake thermal oxidation state indicator; and
the brake condition further comprises an amount of brake wear of the one or more aircraft wheel brakes, and a thermal oxidation state of the one or more aircraft wheel brakes.

19. The method according to claim 18, wherein:
the method comprises selecting the wheel brake wear reduction function or the wheel brake thermal oxidation harmonising function as the second wheel brake control function, if the temperature of at least one aircraft wheel brake is not above the dispatch temperature threshold, based on the amount of brake wear and the thermal oxidation state of the one or more aircraft wheel brakes.

20. The method according to claim 15, wherein:
the method comprises selecting the wheel brake thermal oxidation limiting function as the second wheel brake control function if the temperature characteristic of at least one aircraft wheel brake meets a thermal oxidation limiting criterion.

21. The method according to claim 17, comprising controlling the wheel braking operation according to the first wheel brake control function and the wheel brake wear reduction function, when the wheel brake wear reduction function is selected as the second wheel brake control function.

* * * * *